United States Patent [19]

Forsythe et al.

[11] 4,212,064

[45] Jul. 8, 1980

[54] PERFORMANCE ADVISORY SYSTEM

[75] Inventors: Arthur M. Forsythe, Shelburne; James H. Anapol; Zygmund Reich, both of Burlington, all of Vt.

[73] Assignee: Simmonds Precision Products, Inc., Tarrytown, N.Y.

[21] Appl. No.: 784,819

[22] Filed: Apr. 5, 1977

[51] Int. Cl.² .............................................. G06F 15/00
[52] U.S. Cl. ................................... 364/424; 73/178 T; 244/180; 244/195; 340/27 NA
[58] Field of Search ............. 235/150.2, 150.21, 150.1; 340/27 R, 27 AT, 27 NA; 244/180–182, 195, 196, 190; 73/178 T; 35/10.2; 445/1; 364/200, 900, 424

[56] References Cited

U.S. PATENT DOCUMENTS

| | | | |
|---|---|---|---|
| 3,714,624 | 1/1973 | Story | 340/27 R |
| 3,774,017 | 11/1973 | Zagalsky | 235/150.2 |
| 3,798,611 | 3/1974 | Gallant et al. | 364/900 |
| 3,813,063 | 5/1974 | Martin | 244/182 |
| 3,865,071 | 2/1975 | Manor | 73/178 T |
| 3,906,204 | 9/1975 | Rigdon et al. | 364/200 |
| 3,906,437 | 9/1975 | Brandwein et al. | 235/150.2 |
| 3,979,058 | 9/1976 | Katz et al. | 364/900 |
| 4,038,526 | 7/1977 | Eccles et al. | 235/150.21 |
| 4,040,005 | 8/1977 | Melvin | 244/181 |

Primary Examiner—Errol A. Krass
Attorney, Agent, or Firm—Kenyon & Kenyon

[57] ABSTRACT

A performance advisory system which includes a display, a control unit and an onboard computer, the computer receiving inputs from aircraft instruments and gauges and from the control unit and providing advisory output information on the display.

22 Claims, 8 Drawing Figures

A = ALPHA NUMERIC DISPLAY
N = NUMERIC DISPLAY

| MODE SELECTION | | | | |
|---|---|---|---|---|
| PRIMARY MODE | SUBMODE | DERATE | FLAP ELECTRICAL INPUT | MANUAL DATA ENTRY |
| POWER UP | | | | |
| PF | | | | 10 PARAMETERS |
| TO | | OFF | | |
|  |  | ON | | |
| CLB | ECON | OFF | | |
|  |  | ON | | |
|  | STD | OFF | | |
|  |  | ON | | |
|  | RATE | OFF | | |
|  |  | ON | | |
|  | ANGL | OFF | | |
|  |  | ON | | |
|  | ICPT | OFF | | DIST |
|  |  | ON | | |
| CRZ | ECON | | | |
|  | CNST | | | |
|  | MAX | | | |
|  | ICPT | | | DIST TIME |
| TBC PEN | | | | |
| DSNT | ECON | | | |
|  | STD | | | |
|  | RATE | | | |
|  | ANGL | | | |
|  | ICPT | | | DIST |
| HLD | LINR | | | |
|  | RCTK | | | |
| APP | 1530 | | <30 | |
|  |  | | ≥30 | |
|  | 2540 | | <40 | |
|  |  | | ≥40 | |
|  | L30 | | | |
|  | L40 | | | |
| | | | = NOT APPLICABLE | |
| | TABLE I | | | |

FIG. 3A

TABLE III
PAS READY-REFERENCE CHART

| CONTROL UNIT READOUT | | | | | |
|---|---|---|---|---|---|
| NORM (T/D OFF) | | | T/D | | |
| LEFT | RIGHT | C/I | LEFT | RIGHT | C/I |
| GO TO PF | | | | | |
| OK | ---- | | | | |
| RW°C | tt.t | X | | | |
| ECON | aaa | X | Ehmm | dddd | |
| STD | aaa | X | S | | |
| RATE | aaa | X | R | | |
| ANGL | aaa | X | A | | |
| ICPT | aaa | X | I | | X |
| ECON | .mmm | | E | | X |
| CNST | .mmm | X | C | | X |
| MAX | .mmm | | M | | X |
| ICPT | .mmm | | I | | X |
| TURB | .mmm | | T | | X |
| ECON | aaa | X | E | | |
| STD | aaa | X | S | | |
| RATE | aaa | X | R | | |
| ANGL | aaa | X | A | | |
| ICPT | aaa | X | Ihmm | dddd | |
| LINR | h.mm | | | | |
| RCTK | h.mm | | | | |
| 1530 | f.f | X | | | |
|  | f.f | X | | | |
| 2540 | f.f | X | | | |
|  | f.f | X | | | |
| L30 | f.f | X | | | |
| L40 | f.f | X | | | | tt.t = temperature °C
aaa = altitude 100ft
.mmm = Mach number
h.mm = time hr/min
dddd = distance nm
f.f = flight path angle degrees

▨ = T/D MODE NOT ACTIVE

X = SYSTEM ACCEPTS A CLEAR/INSERT

FIG. 3B

| ANNUN. | DISPLAY UNIT | | | | | | | |
|---|---|---|---|---|---|---|---|---|
| | UPPER SCALE | | | | LOWER SCALE | | | |
| | POD | CTR | PAT | IAS | POD LIM | CTR LIM | OPT ALT | MAX ALT |
| PF | ▨ | ▨ | ▨ | ▨ | ▨ | ▨ | ▨ | ▨ |
| PF | ▨ | ▨ | ▨ | ▨ | ▨ | ▨ | | |
| TO | | | ▨ | ▨ | ▨ | ▨ | ▨ | ▨ |
| TOR | | | ▨ | ▨ | | | ▨ | ▨ |
| CL | | | | | | | | |
| CLR | | | | | | | | |
| CL | | | | | | | | |
| CLR | | | | | | | | |
| CL | | | | | | | | |
| CLR | | | | | | | | |
| CL | | | | | | | | |
| CLR | | | | | | | | |
| CL | | | | | | | | |
| CLR | | | | | | | | |
| CRZ | | | | | | | | |
| PEN | | | | | | | | |
| DST | | | | | | | | ▨ |
| HLD | | | | | | | | |
| A15 | | | | | | | | ▨ |
| L30 | | | | | | | | |
| A25 | | | | | | | | |
| L40 | | | | | | | | |
| L30 | | | | | | | | |
| L40 | | | | | | | | ▨ |
| | | | | | | | | |
| FORMAT | #.### | #.### | #.## | b### | #.### | #.### | b### | b### |

FORMAT ⟶  ↑ -,1,blank   ⊤ b=blank   ▨ =DISPLAY NOT ACTIVE

*FIG.3C*

PERFORMANCE ADVISORY SYSTEM

BACKGROUND OF THE INVENTION

This invention relates to aircraft control in general and more particularly to an improved system to help pilots of commercial airlines operate their aircraft to obtain maximum performance, particularly in terms of fuel economy.

Presently, flight crew must utilize a plurality of charts and tables carrying out complex interpolations in order to get an idea of proper power settings, altitude, rate of climb, etc., in order to determine how to obtain best performance from their aircraft. These tables, of course, require the flight crew gathering data such as aircraft gross weight, altitude, air temperature, true air speed, mach number, etc., all of which is time consuming. As a result, quite often commercial aircraft are not operated at maximum efficiency resulting in the consumption of large amount of fuel which could otherwise be saved. At the present time with the shortage of fuel and its high cost, it is particularly important that all possible steps be taken to economize on fuel consumption. Not only does this contribute to overall energy conservation, but from the standpoint of the operator of the aircraft it can produce substantial savings.

Thus, it becomes apparent that there is a need for an improved system for informing the pilot as to the optimum operating conditions.

SUMMARY OF THE INVENTION

The present invention provides such a system. The basic elements of the system are a dedicated computer, a display unit for displaying information to the pilot and a control unit containing both display and input devices.

The control unit permits the pilot to insert information with respect to various aircraft parameters and also to select a mode of operation. This information is provided to the computer system. Additional inputs to the computer are inputs obtained from the aircraft instrument system, such as mach number, air speed, altitude, etc. Based on the mode selected by the pilot and this data the display unit then displays to the pilot information such as optimum altitude, optimum airspeed, maximum altitude, etc. Although directed primarily to economy, the system also permits determining optimum settings for other purposes. For example, in a climb mode information regarding the best rate of climb, best climb angle and settings for intercepting a target altitude at a selected distance can be provided in addition to providing settings for a best fuel economy.

BRIEF DESCRIPTION OF THE DRAWINGS

FIGS. 3A-C are tables summarizing various modes of operation.

DETAILED DESCRIPTION OF THE INVENTION

Figures 1A, 1B:
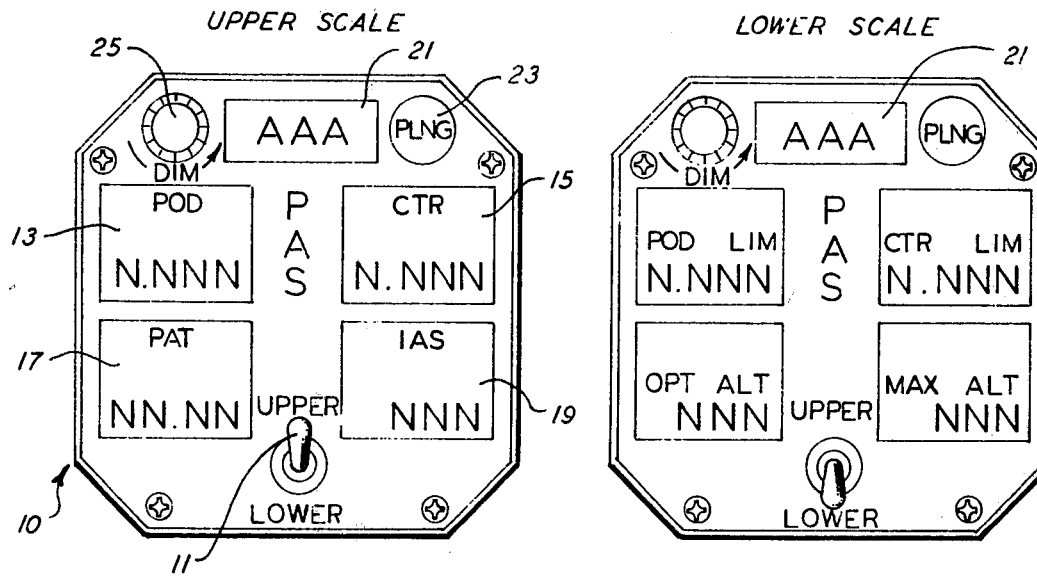
FIG. 1a illustrates the display of the present invention in the "Upper" mode.
FIG. 1b illustrates the display of FIG. 1 in the "Lower" mode.

Prior to explaining in detail the manner in which data is processed to obtain the advisory information, the various functions which the system can perform along with the types of inputs and outputs provided from the system will be discussed. FIGS. 1a and 1b illustrate the display unit 10 in its two modes of operation. The display unit permits the output of eight numerical parameters, four at a time on two scales, an upper and a lower scale. A switch 11 associated with the display panel 10 is used to select between "UPPER" and "LOWER". FIG. 1a shows the parameters displayed when "UPPER" is selected. On a first display section 13 the Pod Engine Pressure Ratio required is provided. On the adjacent display section 15 the quantity CTR, Center Engine Pressure Ratio Required is displayed. At the display section 17, PAT or Command Pitch Attitude is displayed and finally on the display 19, IAS the Command Indicated Airspeed is displayed. The parameters displayed on the upper scale are commands which, if followed will result in the attainment of the objective for the mode selected. The various modes which can be selected will be described in more detail below in connection with Table 1.

On the lower scale is illustrated by FIG. 1b, the display section 13 displays a quantity designated POD LIM which is the POD Engine Pressure Ratio Limit. Similarily the display section 15 displays a quantity designated CTR LIM which is the Center Engine Pressure Ratio Limit. The display section 17 displays OPT ALT or Optimum Altitude, and the Section 19 MAX ALT or Maximum Altitude. The parameters displayed on the lower scale provide information for use in planning and comparison of various alternatives. The display also provides an alphanumeric annuciation of the system mode on a display section 21. This mode is selected by means of the Control Panel to be described below and assures the operator that the computer has actually acquired the selected mode. There is also provided an amber caution indicator designated PLNG (planning). When lighted, this reminds the operator that the numeric values displayed do not represent command settings to be followed at that time. Rather, with the system in PLNG mode, the displays provide information that is used to plan alternate profiles for future phases of the flight. In other words, as will be seen in more detail below not only can the system be used for determining optimum operating conditions for the portion of the flight in progress, but, through insertion of appropriate data can be used for planning future phases of the flight. Also provided on the display 10 is a dimmer control 25 to control the intensity of the display.

Figure 2:
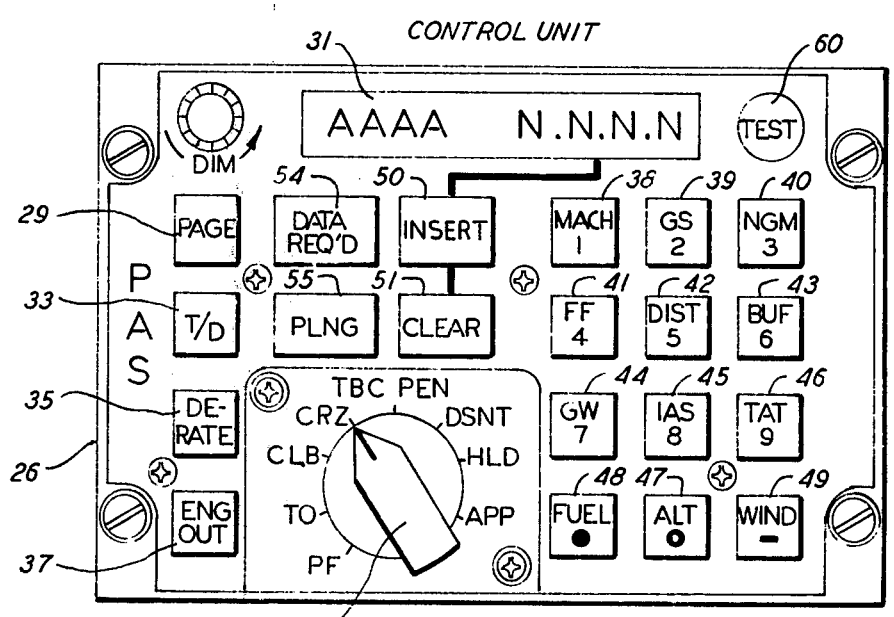
FIG. 2 illustrates the control unit of the present invention.

FIG. 2 illustrates the control unit of the system of the present invention. Included is a mode selector 27. This is an eight position rotary selection switch and is the primary mode selection control. The switch positions are:

| | |
|---|---|
| PF | Pre-Flight |
| TO | Takeoff |
| CLB | Climb |
| CRZ | Cruise |
| TBC PEN | Turbulent Air Penetration |
| DSNT | Descent |
| HLD | Holding |

| | -continued |
|---|---|
| APP | Approach |

Some of the primary modes have one or more variations or sub-modes. To select such a PAGE switch 29 is used to select the desired variation. Each variation is identified by name of a Control Unit readout device or display 31. When a primary mode is first selected on the rotary switch, the paging sequence automatically advances to the first sub-mode which is the most frequently used variation, or, the variation the crew is encouraged to use in the interest of saving fuel. In that case the system performs its advisory functions with no further pilot action. The paging action is cyclic. Each time the PAGE button is pressed the system advances to the next sub-mode, and after the last sub-mode is reached the sequence circles back to the first sub-mode. Table I below tabulates all of the various modes and available sub-modes. An important thing to note is that because of the implementation of the present system with a dedicated computing apparatus rather than by means discrete logic or the like the pages can be added, deleted or rearranged without modifying any of the hardware. All that is required is proper reprogramming of the computer.

TABLE I

| PAS MODES, SUB-MODES | |
|---|---|
| NAME | DESCRIPTION |
| PRE-FLIGHT | Used to load data into system |
| TAKEOFF | Provides takeoff EPR settings for indicated runway temperature |
| CLIMB | Provides climb profile data to target flight level, tfl, for: |
| ECON (tfl) | best fuel economy |
| STD (tfl) | standard, fixed speed schedule |
| RATE (tfl) | best rate of climb |
| ANGL (tfl) | best climb angle |
| ICPT (tfl) | intercepting the target altitude at a selected distance |
| CRUISE | Provides cruise advisory data and mach number, M, for: |
| ECON (M) | best specific ground range |
| CNST (M) | selected constant mach number |
| MAX (M) | maximum available speed |
| ICPT (M) | intercepting a selected distance in a selected time using minimum fuel (not constant speed) |
| TURBULENCE | Provides proper advisory data for penetration of air turbulence |
| DESCENT | Provides descent profile data to target flight level, tfl, for: |
| ECON (tfl) | best fuel economy |
| STD (tfl) | standard fixed speed schedule |
| RATE (tfl) | best rate of descent |
| ANGL (tfl) | best descent angle |
| ICPT (tfl) | intercepting the target altitude at a selected distance |
| HOLDING | Provides advisory data with display of holding time available to reserve fuel for: |
| LINR (time) | linear holding |
| RCTK (time) | racetrack holding |
| APPROACH | Provides advisory data for selected flight path angle at: |
| 1530 (fpa) | approach flaps 15°, landing flaps 30° |
| 2540 (fpa) | approach flaps 25°, landing flaps 40° |
| L30 (fpa) | landing flaps 30° |
| L40 (fpa) | landing flaps 40° |

Below PAGE is a button 33 labeled T/D; this is the TIME FOR DISTANCE button and used to cause time for distance data to be presented on the Control Unit readout 31 in lieu of the sub-mode annunciation data. The use of this type of data will be described in detail below. This is an illuminated button and lights when in the T/D mode. Below this button is a button 35 labeled DERATE. This button is used to select reduced thrust operation for takeoff and climb modes. When this button is on, the Engine Pressure Ratio commands are reduced in accordance with the airline's EPR reduction strategy, and the climb profiles are adjusted accordingly. As is the case in current airline practice, the crew must decide whether the takeoff conditions allow the use of reduced thrust. That is to say a decision must be based on a runway length, pavement conditions, ice, slush, etc. The DERATE lamp is not operative in any mode except takeoff or climb.

Below this button is a button labeled ENG OUT. This button 37 is used to tell the system that an engine is inoperative and the button is illuminated by an amber light when there is an ENGINE OUT status. This button must be used in conjunction with other input devices to inform the computer which engine is out. As shown on FIG. 2, there are a group of twelve buttons 38–49 on the left hand portion of the control unit. The buttons 38–47 are for entering the numerals 1 through 0 in the computer memory. A location in the memory is assigned to ENGINE OUT and upon initialization this location has stored therein a word indicating that all engines are operating. Pressing the ENGINE OUT button 37 will first cause the word ENG to be displayed on the display 31. This permits the pilot to use one of the numeric buttons to enter into the computer which of the engines is out. For example, if engine number 2 is out, he would press button 2. This number would then appear in the numeric portion of the display 31 and at the time be loaded into the computer. This can also be used in a PLANNING mode. Thus, the pilot may wish to get information regarding an ENGINE OUT condition and then return to his normal condition of all engines operating. In that case, he again presses ENGINE OUT and, assuming he had previously indicated that engine 2 was out, the display would show ENG 2. This word is now available for modification and he need only press the clear button 51 to clear this data whereupon the data will be taken out of the memory and the ENGINE OUT lamp will be extinguished. At any time there is an engine out condition, the ENGINE OUT light remains lighted. It is possible to set up any combination of engines as being out, the only condition being that there must be one engine operating. Although, it would be possible to provide an automatic input of an ENGINE OUT status, an engine is usually shutdown by the pilot. Thus, the system allows him to determine what would occur if the engine was shutdown and can aid him in his decision as to whether or not to shutdown using information based on the results of the performance advisory along with the other indications he has that may cause him to consider shutdown. Next to the PAGE button 29 is a button labeled DATA REQ'D. This button 54 is used whenever the selected sub-mode requires the manual entry of data. Most modes do not require such entry. If a sub-mode does require the entry of data, this button illuminates and the display unit 10 remains blank until data is entered. The pilot acknowledges the request for data by pressing button 54 whereupon readout 31 tells him what information is required. For example, it might indicate DIST indicating the need for distance information. Thereupon using the numeric keyboard, the pilot enters the required distance information which, as he enters it will appear on the display 31. After entry he presses an INSERT button 50 to load this data into the computer. Once this data is accepted by the computer it advances to ask for the next piece of data required, if such is required. When all necessary data has been inserted, the DATA REQUIRED lamp 54 is extinguished and the readout reverts to its normal function of displaying the sub-mode.

Although the INSERT button 50 and CLEAR button have been explained above in connection with entry with different types of data their general modes of operation will now be explained. Pressing the INSERT button will cause the numeric data appearing on the readout 31 to be entered into the computer. However this occurs only if the INSERT lamp is illuminated prior to pressing it. The system is designed to light the INSERT button only when information is displayed which can be changed by the pilot. This is necessary since some displayed information is not subject to change. The CLEAR button serves two purposes. In conventional fashion, it may be used to recover from a keystroke error. In other words, if on entering data the pilot makes a mistake, he can clear that data and start over before entering it into the computer. The other purpose of the CLEAR button is to clear data already in the computer. If computer data is being displayed and if that data is capable of being changed, pressing CLEAR will clear the data then stored, cause the insert lamp to light and then permit entry of new data. The manner in which all of this occurs will become more evident in the explanation below. The remaining button 55 on the panel is the one labeled PLNG. This is the planning mode button which permits the pilot to place the system in a planning rather than an operational mode. As explained above this permits the pilot to plan ahead for future phases of the flight. Pressing the button once will place the system in the planning mode and illuminate this button along with amber planning light 23 on the display 10. Pressing it again will take the system out of the PLANNING mode and put it back into the operation mode, causing the associated lamps to be extinguished.

As is evident from their labeling the keyboard buttons 38–49 perform a dual function. In addition to being a conventional keyboard each button is also assigned an additional function. Each key is imprinted with name of a performance-related parameter and may be used to call up that parameter for display on the Control Unit display 31. As general rule, when the INSERT button is illuminated the keyboard is in the numeric mode and pressing one of the keys 38–49 will cause the corresponding number to appear in the display register 31. When the INSERT light is not illuminated the keyboard is in the "parameter" mode and pressing a key will cause the value of the corresponding parameter to appear on the readout 31. Generally, the parameter will be displayed only as long as the button is depressed, and when the button is released the readout will revert back to its normal function. However, in some instances the system interprets the action as a cue that the pilot wishes to insert a new value for the parameter. When such is the case, pressing the key causes the present value of the corresponding parameter to be displayed and the INSERT button 50 to illuminate. The pilot may then clear the display and key in a new number and then press the INSERT button 50. If he does not wish to revise the number, he can simply press INSERT button and the display 31 returns to its normal function. The twelve parameters available for the illustrated system which is specifically designed for a Boeing 727 aircraft are as follows:

| Key # | Parameter | Name |
|---|---|---|
| 1 | MACH | Mach |
| 2 | GS | Ground Speed |
| 3 | NGM | Nautical Ground Miles/1,000 lbs. (Specific ground range) |
| 4 | FF | Fuel Flow - per engine |
| 5 | DIST | Distance Capability to reserve fuel |
| 6 | BUF | Buffet Margin |
| 7 | GW | Gross Weight |
| 8 | IAS | Indicated Airspeed |
| 9 | TAT | Total Air Temperature |
| . | FUEL | Total Fuel Quantity |
| 0 | ALT | Altitude |
| — | WIND | Wind Component |

As will be shown in more detail below, the computer continually obtains inputs relating to fuel quantity, flap angle, altitude, true airspeed, mach number, static temperature, and valve positions. The pilot enters other information necessary for the computations. The information which is entered by the pilot is listed in Table II. This is done with the selector switch 27 in the PF-i.e. Pre-Flight Mode. The code words of the table are presented to the pilot on the readout 31 and the pilot enters the necessary data in the manner described above. When the system is in the planning mode, the parameters which normally are obtained from sensors in the aircraft can also be inserted by the pilot for planning purposes.

TABLE II

| CODE | PARAMETER | UNITS | NOTE |
|---|---|---|---|
| ZFW | Zero fuel weight | lbs. × 1,000 | |
| RSAL | Reserve and alternate fuel | lbs. × 1,000 | |
| DELV | Elevation at destination airport | ft. × 1,000 | |
| DIST | Trip distance | NM | |
| CRZW | Averge cruise wind component | ±KTS | |
| CLBW | Average climb wind component | ±KTS | * |
| TROP | Tropopause altitude at top of climb | ft. × 1,000 | |
| CZFL | Planned initial cruise altitude | FL | |
| CZ °C. | Outside air temperature at planned cruise FL | ± °C. | ** |
| RW °C. | Outside air temperature at takeoff runway | ± °C. | |

NOTES
*A numeric value equal to 60% of the cruise wind component will appear in the display when the CLBW parameter is requested. If the pilot has no better estimate of average climb wind it is suggested he use this value.
**A numeric value corresponding to the standard day temperature for the planned cruise flight level is displayed when the CZ °C. parameter is requested. This facilitates entry in those cases where the pilot is given a temperature deviation rather than a temperature. (He can mentally add the deviation to the standard temperature and insert the result.)

Any time when power is first applied or after a power interruption of sufficient duration results in loss of stored data, the system generates a message to the pilot that instructs him to go into the pre-flight mode, an indication being given on the readout 31 "GO TO PF".

Table III of FIGS. 3A–C is a summary of the operation in various modes mentioned above. The left section of the table indicates the mode selection parameters and necessary input data. The middle section illustrates the data displayed on the control unit readout 31 and the right hand section indicates what is displayed on the display unit 10. The middle section also illustrates the possibility of a "time for distance" display. As indicated, in the climb, cruise, turbulence penetration, distance modes, this function is operable. The computer continuously computes time for distance data whether or not the time for distance button 33 of the control unit of FIG. 2 is pressed or not. Pressing the buttom simply controls the display mode. On the display, the first alphanumeric display character displays the first letter of the sub-mode identification. The next three characters give time in hour and minutes and the last four numeric displays the distance in nautical miles.

In the climb and descent modes the distance displayed is the ground distance that remains to be travelled in reaching the target altitude using the selected profile. When in cruising or turbulence penetration mode the distance may be set or revised at any time by the pilot using clear/insert sequence. The distance counts down automatically as a function of the ground speed "advisory" i.e., the ground speed that should occur if the pilot follows the IAS Advisory with the wind manually inserted. This distance is called the cruise distance. The displayed value of time is the time it will take to cover the distance using the selected sub-mode profile. It should be noted that the best fuel economy can be achieved by flying a varying speed profile wherein the speed is reduced as the aircraft weight decreases with fuel burnoff. However, it is difficult to estimate the time to go in a varying speed profile. The time to distance function provides time to go information that takes into account the fact that the speed will continue to vary. With altitude changes, best fuel economy sometimes requires relatively low rates of climb or descent. The time and distance to target altitude data assist the pilot in complying with ATC requirements while at the same time saving fuel.

The system also has some advisory alert functions which are used in the cruise mode after the aircraft has settled at a flight level and has tracked the IAS advisory for a reasonable time. One of these is a step climb alert which is given when the weight has decreased to the point where the aircraft has altitude capability for a 4 thousand foot step climb. A flashing ALT message on the display 31 is given. This message is cancelled by pressing the ALT key and is re-issued at 10 minute intervals if the condition does not change. Also given is a speed alert. This occurs when the aircraft speed differs from the IAS advisory by more than three knots, with sporadic pertubations due to wind variations filtered out. The system displays a flashing IAS message on the display 31. This message can also be cancelled by pressing the IAS key and is also re-issued at 10 minute intervals if the speed is not brought within range.

Returning to FIG. 2, there is also shown a test button 60. This is used to perform a lamp test and will cause all segments of all displays to be lighted. In addition, the six pushbuttons on the control panel will illuminate along with the planning light on the display unit. The page and clear buttons as well as the keyboard buttons are not lighted by the computer. In addition, there is automatic monitoring equipment to detect the burn out of one of the segments in the alpha-numeric displays to prevent displaying erroneous data. Circuitry causes the entire digit to be blanked whenever the system tries unsuccessfully to light a critical segment. Furthermore, the computer has built into it self-testing functions and upon detecting a failure blanks the display unit and places a warning message on the display 31 of the control unit with a code number indicating the basic nature of the malfunction.

Figure 4:
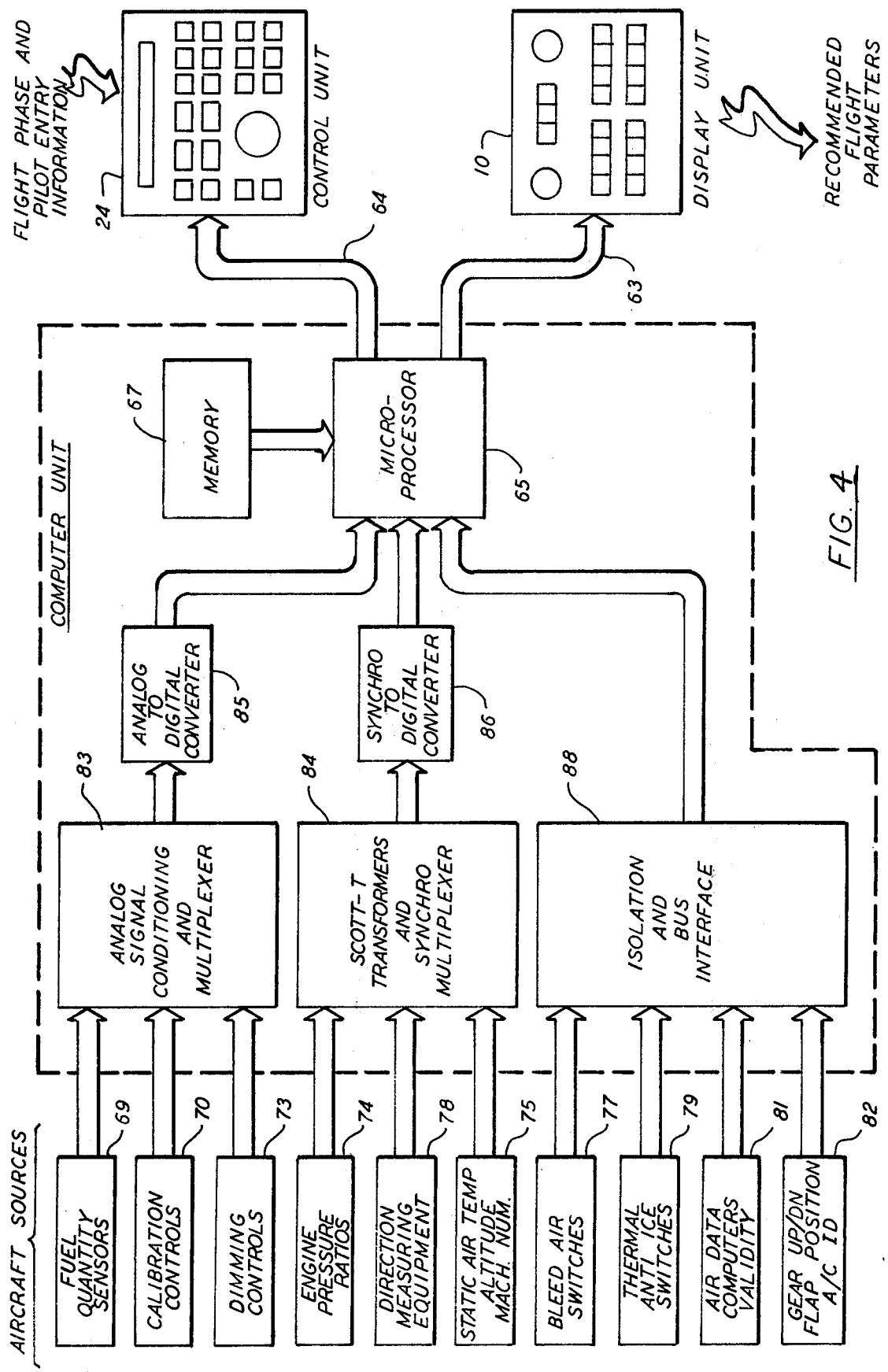
FIG. 4 is a basic block diagram of the system of the present invention.

FIG. 4 is a basic functional block diagram of the system of the present invention which permits carrying out the types of functions described above. Shown is the display unit 10 described above along with the control unit 24. These are coupled over appropriate busses 63 and 64, on which data and addresses can be fed, to a micro-processor 65 having associated therewith a memory 67. An example of a computer which may be used is the SECS-11 micro-processor manufactured by Electronic Memories and Magnetics Severe Environmental Products Division. As is conventional in such systems, the memory will include read only memory in which the fixed program is stored along with random access memory for storing data which changes. The microprocessor provides appropriate outputs to the display unit 10 and control unit 24. It receives inputs from the control unit relating to the parameters described above. The micro-processor also receives inputs from fuel quantity sensors 69, calibration controls 70 flap position sensors 82, dimming controls 73, the engine pressure-ratios 74, static air temperature, altitude and mach number indicator 75, bleed air switches 77, distance measuring equipment 78, thermal anti ice switches 79 and air-data computers validity 81. The inputs from sensors 69, 70 and 73 are provided to a multiplexer 83. The multiplexed analog data is converted to digital data in an analog to digital converter 85. Outputs of sensors 74, 75 and 78 are inputs to a multiplexer 84. This synchro data is converted to digital data in a synchro to digital converter 86. The remaining data is digital in nature and is supplied through an isolation and bus interface 88.

Figure 5:
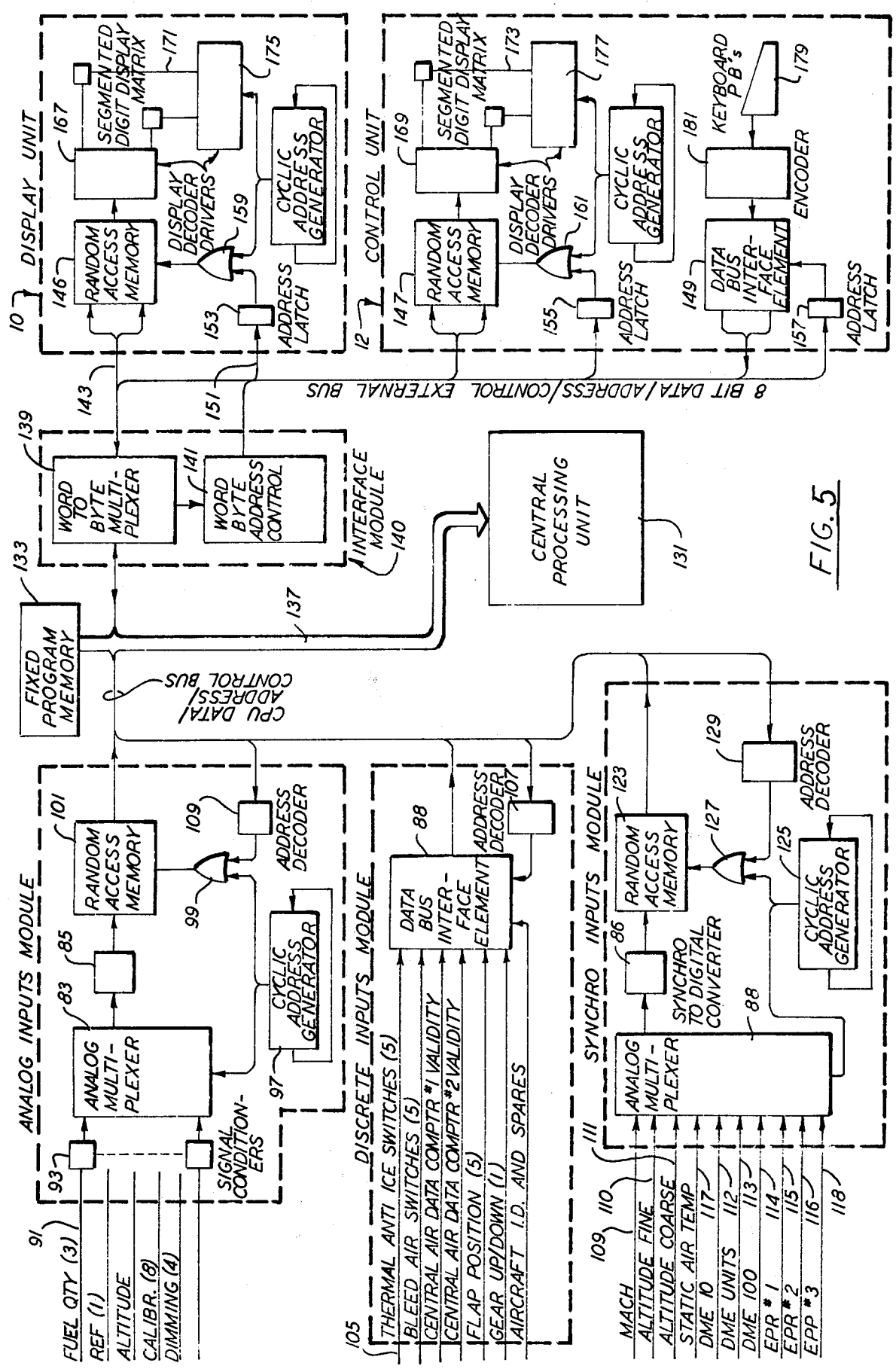
FIG. 5 is a more detailed block diagram of the present invention.

The system is shown in more detail in FIG. 5. An output from a fuel quantity sensor from each tank, which is in analog form, is coupled over a line 91 to a signal conditioner 93 the output of which is an input to the analog multiplexer 83. The analog multiplexer receives an input from a cyclic address generator 97. The cyclic address generator also provides signals into OR gate 99 the outputs of which are provided to a random access memory 101. The output of the analog multiplexer 83 is coupled through the analog digital converter 85 as a data input to the random access memory. The cyclic address generator, in sequence, addresses each of the analog multiplexer inputs causing them to be supplied at the output through the analog digital converter 85 to the random access memory 101. At the same time as it is addressing the multiplexer it is also addressing the random access memory. Thus, the data associated with a particular memory location is accessed both in the multiplexer 83 and the memory 101 so that the proper data is stored in each location.

Digital inputs on lines 105 are provided into the data bus interface element 88 which is addressed by an address decoder 107. A similar address decoder 109 is associated with the random access memory 101. Since these inputs are digital in nature, there is no need for conversion and storage.

Angular input information such as the mach input on line 109, the altitude inputs on lines 110 and 111, the DME inputs on lines 112, 113 and 114, the EPRs on lines 115, 116 and 118 and the static temperature on line 117 are coupled into the analog multiplexer 88 the output of which is provided to the synchro to digital converter 86. The output of this device is provided to another random access memory 123. An additional cyclic address generator 125 addresses the analog multiplexer 88 and the random access memory 123 together causing the input information to be stored in the proper memory locations. Once again, an OR gate 127, actually a plurality of OR gates 127, one for each bit of the address and an address decoder 129 are provided.

The information available on the various input lines such as 91 and 109, 111, 113, 115, 117 along with the information on lines 105 will all be available either in the random access memories 101 and 123 or at the data bus interface 88. Shown in the middle of the figure is a central processing unit 131 which is coupled to a fixed program memory 133. In conventional fashion, the central processing unit will have a combined address data bus 137. Bus 137 may be a 16 bit parallel time multiplexed bi-directional data bus that carries both data and addresses. During the address part of a cycle, the address decoders function in parallel, however, only the addressed module may respond and place data on the lines.

The central processing unit will operate in accordance with programs stored in the fixed program memory 133 which programs are attached hereto. In general the central processing unit 131 in accordance with the stored program, when obtaining input data can address, over the bus 137, any of the input modules. The respective address decoders 107-109 and 129 determine which of the three input sections are being addressed. The remainder of the address is used through the OR gates 99 or 127 or directly into the interfacing equipment 88 to select the byte of memory therein which is desired. Thus, the central processing unit 131 can address the random access memory in the same manner as can the cyclic address generators 97 and 125 to retrieve data. During access by the central processing unit 131 the cyclic address generators are disabled.

The right hand side of FIG. 5 illustrates the manner in which the outputs are provided to the display unit 10 and the manner in which inputs are taken from and outputs provided to the control unit 26. The outputs from the central processing unit on the bus 137 are provided through word to byte interface modules 139 and 141 respectively. The data output on bus 143 from the data multiplexer 139 is coupled to a random access memory 145 associated with the display unit 10, to a random access memory 147 associated with the control unit 12 and to data bus interface element 149 also associated with the control unit 12. The address information out of the address control 141 on bus 151 is coupled to an address latch 153 associated with the display unit 10 and an input address latch 155 associated with control unit 12 and also an output address latch 157 associated with control unit 12. The bus 143 to the control and display units is an eight bit bi-directional time multiplexed data bus. The interface module 140 simply converts the 16 bit bus to an eight bit bus. For both busses, control signals now shown on the diagram control the direction and function of the busses. As data for the various displays is computed it is transferred to the random access memories 146 and 147 in accordance with the selected address placed in the address latches 153 and 155, the outputs of which are coupled through OR gates 159 and 161 to the random access memories 146 and 147. This is the display information. To get the information from the random access memory out to the actual displays cyclic address generators 163 in the display unit 10 and 165 in the control unit 12 are used. The addresses are coupled through the OR gates 159 and 161 to access the proper data location for the desired display. The digital outputs from the memories 146 and 147 are coupled through display decoder drivers 167 and 169 respectively to segmented digit display matrices 171 and 173 respectively. The display matrices 171 and 173 also receive as inputs, through a block 175 and 177 respectively, the selected address generated in a cyclic address generator 163 and 165.

The keyboard pushbuttons 179 provide their outputs to an encoder 181 which includes latching in conventional fashion the output of which, now in suitable format for the micro-processor, is coupled into data bus interface element 149. As noted above, this is addressed by the address latch 157 permitting the micro-processor to scan the input data entered at the control and provide this data as outputs on the data bus 143 and use this information as required in the program. As with the cyclic address generators for other memories, means are provided to detect an associate memory being accessed by the central processing unit 131 and to interrupt cycling until the desired data is removed from or stored in the memory.

Attached hereto is program for carrying out the present invention. As will be recognized by those skilled in the art, the program contains therein the well known flight equations i.e., the same types of equations which were used to draw the charts contained in the performance book formerly used for calculating by hand the type of information provided by the system of the present invention.

```
20:  "IN0 OCT22,76":des;fxd 0
21:  dim D$[75,4],P$[75,2],G$[75,2],K$[75,2],S$[75,2],D[75]
22:  dim F[100],M[50],U[32]
23:  dim H[33],A$[158,4],B$[158,4],C$[158,4]
24:  dim A[25],E[20],J[40],Y[7]
25:  buf "B",32,4
26:  ldf 1,D$,P$,G$,K$,S$,D[*]
27:  ldf 2,F[*],M[*],U[*]
28:  ldf 3,H[*],A$,B$,C$
29:  ldf 4,A[*],E[*],J[*],Y[*]
30:  trk 1;ldf 60,D[*],F[*],M[*];trk 0
31:  M[37]→R
32:  M[38]→F[29]
33:  M[39]→F
34:  M[40]→X
35:  198→U;U+149→V
36:  moct;eir 2,1;wtb 2,177716;mdec
37:  if M[27]=1;M[48]→R;M[49]→A[25];gto "LF"
38:  A[16]→D[39]
```

```
39: for N=15 to 53
40: if N#21;0→D[N]
41: next N
42: 0→E[17];0→M[21];59→D[10]→D[73]
43: A[20]→D[42]
44: A[13]→D[51]→D[52]
45: 30→M[34]
46: 0→F[41];0→M[27]
47: "LF":300→M[35];-9999→D[75];trk 0;ldf 5,0,U
48: end
*2713

20: "5NOV12":
21: "T":rds(2)→r0;cll 'V8'(65473,1)
22: if bit(1,r0)=1;sto "V"
23: if bit(0,P)=0;sto 11
24: M[28]+1→M[28];if M[28]>3;M[29]+1→M[29];sto 6
25: ssb "V61"
26: sir 2
27: iret
28: 17→M[31];sto 10
29: 14→M[31]
30: cll 'V7'(65476);cll 'VV';sto 6
31: cll 'V8'(65483,32);if P=0;iret
32: rot(band(M[20],P),-4)→T;shf(band(M[18],P),4)→S
33: shf(band(M[19],P),8)→M[22];0→r41;if S#0;r41+1→r41
34: if S<0 or S>9;jmp 6
35: if T#0;r41+1→r41
36: if T<0 or T>12;jmp 4
37: if M[22]#R;r41+1→r41
38: if M[22]<=0 or M[22]>8;jmp 2
39: if r41=1;jmp 2
40: M[26]+1→M[26];sto 6
41: if S#0;jmp 3
42: if T#0;jmp 4
43: sto 75
44: if S=M[23];sto 6
45: S→M[23];sto 28
46: if T=M[24];sto 6
47: T→M[24];sto 102
48: jmp S
49: sto 38
50: sto 43
51: sto 70
52: sto 72
53: sto 80
54: sto 89
55: sto 97
56: sto 6
57: sto 99
58: W→T;M[34]→S;59→M[34];for N=1 to 8;D[M[34]]→F[N];next N;ssb "Y1"
59: 65280→F[2]→F[3];for Q=1 to 3;cll 'X2';if Q=2;cll 'V14'(9,F[2])
60: cll 'V12'(8+Q,F[2]);wait 2000;next Q;T→W;S→M[34];ssb "XCU"
61: ssb "YDU"
62: sto 6
63: 0→M[21]→M[23];if bit(8,F)=0;sto 6
64: if W=60;sto 60
65: cll 'V11'(F[1],F[4],0);cll 'V15'(F[4],W,F[1],r40)
66: if r40>0;cll 'V2'(F[1],F[1]);sto "Q1"
67: cll 'V23'(F[4],W,F[4]);if W=29 and R=4;F[4]→D[18]
68: if W>32 and W<38;32→r42;5→Q;jmp 4
69: if W>42 and W<48;42→r42;5→Q;jmp 3
70: if W>50 and W<53;50→r42;2→Q;jmp 2
71: F[4]→D[W];jmp 2
72: for N=1 to Q;F[4]→D[r42+N];next N;if r42=42;D[43]→D[17]
73: if W=39;cll 'IS'(D[W],E[1],A[17]);D[W]→A[16]
```

```
 74: if W=11;jmp 15
 75: if M[32]=0;jmp 2
 76: 0→M[32];if W>14 and W<28;gto 6
 77: "P13";if bit(13,F)=1;29→W;jmp 2
 78: M[33]→W
 79: cll 'V12'(9,F);gto 8
 80: cll 'V13'(F[1],3);if F[5]=1;gto "Q1"
 81: 1→F[43]→F[44]→F[45];3→F[30]
 82: for N=0 to 3;band(shf(F[1],4N),M[17])→r41;if r41=0 or r41>4;jmp 2
 83: 0→F[42+r41]
 84: next N
 85: F[43]+F[44]+F[45]→r42;if r42=0;gto 80
 86: if r42=3;cll 'V12'(12,X);jmp 2
 87: 1→F[29]
 88: r42→F[30];F[1]→D[W];gto "P13"
 89: cll 'EN'(D[1],0,0,0,0,0,0,r41);r41+E[4]→D[54];54→W;cll 'XCU';gto 6
 90: if bit(9,F)=1;0→M[32]
 91: gto 6
 92: if F[29]<F[32+R];1+F[29]→F[29];jmp 2
 93: "PP";1→F[29]
 94: gto 9
 95: "P32":M[22]→R
 96: "P33":if 'V19'(0)=0;cll 'V12'(14,F)
 97: if 'V19'(1)=0;cll 'V12'(11,X)
 98: if 'V19'(2)=0;cll 'V12'(12,X)
 99: cll 'V12'(9,F);0→M[21]→M[32];cll 'V12'(10,F);gto "PP"
100: 0→M[23];if bit(8,F)=0;jmp 2
101: 48059→F[1];gto "Q1"
102: if W<15;gto 6
103: if bit(13,F)=0;jmp 3
104: if bit(0,F[F[42]+45])=0;gto 6
105: jmp 2
106: if bit(1,F[F[42]+45])=0;gto 6
107: cll 'Q5';48059→F[1];gsb "X1"
108: gto 10
109: cll 'V1'(13,F);if bit(12,F)=1;jmp 4
110: D[75]→r41;trk 1;ldf 69,D[*];0→M[50];r41-D[75]→r41;if r41<0;4194.5+r41→r41
111: D[18]-300D[2]/3600→D[18];if M[37]#R;gto 76
112: M[38]→F[29];M[39]→F;M[40]→X;gto 9
113: R→M[37];F[29]→M[38];F→M[39];X→M[40];cll 'V12'(13,M[39])
114: trk 1;rcf 69,D[*];trk 0;gto 8
115: "V1":if bit(p1-1,p2)=0;cll 'V14'(p1,p2);ret
116: cll 'V12'(p1,p2);ret
117: D$[M[33]]→D$[29];if 'V19'(0)=1;cll 'V1'(14,F)
118: "Q":cll 'XCU';gto 6
119: if 'V19'(2)=0;gto 6
120: 60→W;0→E[17];cll 'V14'(12,X);gto "Q3"
121: "V19":bit(p1,F[70+R])→p2;ret p2
122: if bit(8,F)=1;gto "Q2"
123: T→W→M[21];1→F[25];if W>11;jmp 6
124: if W<10;gto "Q"
125: cll 'V14'(W-9,M[50]);if bit(12,F)=0;0→M[50];gto "Q"
126: "Q3":cll 'Q5';cll 'XCU';gto 10
127: "Q5":cll 'V14'(9,F);32→M[31];1→M[32];ret
128: "Q1":cll 'X1';gto 6
129: if R<4;jmp 4
130: if R=6;14→W;jmp 3
131: if R=8;55→W;jmp 2
132: 13→W
133: gto "Q3"
134: "Q2":0→M[24];if T=10;gto 6
135: if T=11;0→T
136: if T=12;15→T
137: shf(F[1],-4)+T→F[1];gto "Q1"
138: "Q4":eir 2;if M[32]=1;jmp 0
139: 0→M[31];trk 0;ldf 11,V,V+17
140: "V2":if p3#66 and p3#68 and p3>60;10int((p1+5).1)→p1
141: if sgn(p1)=-1;abs(p1-.49)→p4;2→Q;jmp 2
142: p1+.49→p4;3→Q
143: 10frc(p4/10)→p2;for O=1 to Q;int(p4/10)→p4
144: 10frc(p4/10)→p3;p2+16↑Op3→p2;next O;if Q=2;p2+M[20]→p2
```

```
145: ret
146: "V11":cll 'V13'(p1,10);for N=0 to Q-1;band(shf(p1,4N),M[17])→p4
147: 10↑Np4+p3→p3;next N;p3→p2;if F[5]=1;p2-2p2→p2
148: ret
149: "V12":band(cmpM[p1],p2)→p2;ret
150: "V14":ior(M[p1],p2)→p2;ret
151: "V13":for Q=0 to 3;band(shf(p1,4Q),M[17])→p3;if p3=15 and W=60;jmp 4
152: if p3=15 and p2>4;jmp 5
153: if p3=11;jmp 3
154: if p3>p2;jmp 3
155: next Q
156: 0→F[5];ret
157: 1→F[5];ret
158: "V15":0→p4;if p1>itf(G$[p2]);itf(G$[p2])→p3;jmp 3
159: if p1>=itf(K$[p2]);ret
160: itf(K$[p2])→p3
161: 1→p4;ret
162: "V3":for N=1 to p5;wtb "B",D$[p4,N,N];rdb("B")→r41;if r41>64;r41-55→r41
163: shf(r41,-8)→r41;ior(r41,p1+p37+p3(N-1))→U[p2+N];next N;ret
164: "V4":for N=0 to 3
165: rot(F[p1],-4N)→r43;band(r43,M[20])→r43;if r43=-24576;-28672→r43
166: shf(F[p2],-4(N-1))→r40;band(r40,M[19])→r40;if r40=2560;2304→r40
167: 'V5'(r43,r40,p3+p37+2N)→U[N+p4];next N;ret
168: "V5":ior(p1,p2)→p5;ior(p5,p3)→p5;ret p5
169: "V6":for N=2 to r41;cmpU[N]→U[N];next N;0→M[28];-1→U[1]
170: "V61":cll 'V21';cll 'V10';ret
171: "V7":eir 2,0;eir 2,1;moct;wtb 2,dtop1;mdec;eir 2,2;ret
172: "V8":gsb "V7"
173: for N=1 to p2;rdb(2)→P;next N
174: eir 2,1;moct;if N>2;jmp 2
175: wtb 2,177703;jmp 3
176: wtb 2,177716;jmp 3
177: "V10":cll 'V7'(r40);tfr "B",2
178: "VV":mdec;eir 2,0;ret
179: "V21":for N=1 to r41;wtb "B",U[N];next N;ret
180: "V24":rot(p1,-4N)→r41;band(M[20],r41)→r41;rot(r41,4)→r42
181: if r42=2560;2304→r42
182: if r42=M[19];9216→r42;ret
183: if r42=2816;jmp 4
184: if min(1,itf(P$[W]))>3-N;jmp 2
185: if r42=0;if r43=0;jmp 2
186: 1→r43;ret
187: 15872→r42;ret
188: jmp 1
189: "XCU":cll 'V20'(D[W],W,F[1]);if W=60;jmp 2
190: cll 'V15'(F[1],W,F[1]);cll 'V2'(F[1],F[1])
191: "X1":ior(X,shf(itf(P$[W]),-8))→F[2];F→F[3]
192: "X2":cll 'V3'(8,1,2,W,4);0→r43;for N=0 to 3;cll 'V24'(F[1])
193: ior(r42,16+2N)→U[N+6];next N;if W#29;jmp 3
194: cll 'V15'(D[28],28,D[28]);cll 'V2'(D[28],r44)
195: 0→r43;for N=1 to 3;cll 'V24'(r44);ior(r42,8+2N)→U[N+2];next N
196: ior(F[2],24)→U[10];ior(F[3],26)→U[11]
197: 0→U[12];if M[30]=1;0→M[30];jmp 4
198: if F[25]=1;0→F[25];jmp 4
199: if M[21]=0 or bit(8,F)=1;jmp 3
200: 0→M[21]
201: 126→U[12]
202: 0→M[24];12→r41;65481→r40;gto "Y5"
203: "YDU":for N=0 to 7;61+N→r40;cll 'V20'(D[r40],r40,F[N+1])
204: cll 'V15'(F[N+1],r40,F[N+1]);cll 'V2'(F[N+1],F[N+1],r40);next N
205: "Y1":cll 'V3'(10,1,2,M[34],3);cll 'V3'(74,12,2,M[34],3)
206: if R#8 or F[29]=1;jmp 3
207: cll 'V2'(2,r40);for Q=0 to 1;0→r43;for N=2 to 3;cll 'V24'(r40)
208: ior(r42,M[44+Q]+2(N-2))→U[1+N+11Q];next N;next Q
209: 5→r41;for Q=0 to 1;for O=0 to 1
210: cll 'V4'(1+O+2Q,5+O+2Q,M[46+Q]+8O,r41+4O)
211: next O;r41+11→r41;next Q;23→r41;65482→r40
212: "Y5":cll 'V6';ret
213: "V20":itf(S$[p2])p1→p3;ret
214: "V23":p1/itf(S$[p2])→p3;ret
215: "V":oni 2,"T",2;buf "B";eir 2,0;if M[31]=32;gto "O4"
```

```
216: M[31]→r36;0→M[31];trk 0;ldf 11,V,V+r36
217: "ERR":on err "ERR";29→M[31];gto 10
218: on err "ERR"
219: sfg 14;oni 2,"T",2
220: eir 2,32;eir 2,0;14→M[31]
221: cll 'V8'(65475)
222: ldf 6,U,V
223: end
*28712

20: "EY":if F[41]=1;trk 0;ldf 17,V,V
21: "EX1":if R=1;D[24]→J[1];jmp 2
22: "6":D[9]→J[1]
23: cll 'EN'(D[11],D[71],J[1],E[1],E[2],E[3],E[4],E[5])
24: A[25]+D[10]→D[7];trk 1;ldf 60+R,V,V
25: "EZ":cll 'V12'(11,X);if M[35]<300;trk 0;ldf 13,V,V
26: trk 0;ldf 11,V,V+20
27: "AC":if p1<1;jmp 4
28: 'MA'(p1,p3)→r22;.2r22↑2+1→r20;r20-r20↑(-2.5)→r21;if p2>D[21];jmp 2
29: r21-.133r22↑2→p4;jmp 5
30: r21→p4;jmp 4
31: if p2<D[21];jmp 2
32: 0→p4;jmp 2
33: -.133p1↑2→p4
34: cll 'EL'(7,E[6],D[11],Y,D[64],D[63])
35: if D[62]>D[64];D[64]→D[62]
36: if D[61]>D[63];D[63]→D[61]
37: r16→r32
38: 'FF'(D[11],r32,D[1],E[1],E[2],E[6])→r35
39: 'BU'(r14,D[1],E[1])→D[6]
40: 'AT'(7,D[11],D[1],r14,r16,r16,r15,0)→D[65]
41: cll 'DR'(D[15]+D[16],E[1],D[1],r15,r16)
42: cll 'ER'(D[1],D[11],r16,E[1],r17,r18)
43: 'TH'(r18,r17,D[1],D[11],E[1])→r33
44: 'FF'(D[11],r33,D[1],E[1],E[2],E[6])→r19
45: 60(D[10]-D[16])/((r35+r19)/2)→D[48]→D[49]
46: if D[48]<0;0→D[48]→D[49]
47: if F[29]=2;jmp 3
48: cll 'GS'(D[13],E[3],D[1],D[2],E[14]);'CZ'(D[2],r35)→D[3]
49: trk 0;ldf 15,V,V
50: r35/F[30]→D[4];((F[43]+F[45])D[61]+F[44]D[62])/F[30]→r12
51: if r12>D[63] or r12>D[64];jmp 2
52: r12→D[61]→D[62]
53: cll 'EL'(7,D[9],D[11],Y,D[64],D[63]);if D[62]>D[64];D[64]→D[62]
54: if D[61]>D[63];D[63]→D[61]
55: if E[17]=1;trk 0;ldf 8,V,V
56: if D[61]>D[63];D[61]→D[63]
57: E[17]+1→E[17]
58: if E[17]>A[17];0→E[17]
59: gto "EZ"
*23608

20: "APR68":R→F[32];0→D[67]→D[68]
21: if F[29]=1;30→r12;'ASM'(D[7],r12)→D[50];D[50]-5→D[50];gto "AA"
22: 'ASM'(D[7],Z)→D[66]
23: 'MA'(D[66],E[1])→D[1]
24: cll 'DR'(D[7],E[1],D[1],r14,r15)
25: cll 'GS'(D[55],E[3],D[1],r16,r17)
26: 'DS1'(r16)→r18
27: 'AC'(D[66],D[11],E[1])→r19;-r19→r19
28: 'DT'(r15,r18,D[7],r19,r17)→r31
```

```
29: cll 'EL'(8,D[9],D[11],Y,D[64],D[63])
30: cll 'ER'(D[1],D[11],r31,E[1],D[62],D[61])
31: 'AT'(8,D[11],D[66],D[7],r31,r15,r14,Z)→D[65]
32: 'TH'(D[61],D[62],D[1],D[11],E[1])→r32
33: 'ATT'(D[1],E[3])→E[6]
34: 'FF'(D[11],r32,D[1],E[1],E[2],E[6])→D[4]
35: D[4]/F[30]→D[4]
36: ((F[43]+F[45])D[61]+F[44]D[62])/F[30]→r12
37: if r12>D[63] or r12>D[64];jmp 2
38: r12→D[61]→D[62]
39: "AA":gto "EZ"
40: "DS1":
41: .101268p1tan(D[51])→p2
42: ret p2
*19184

20: "MDIV":prt "TIME@CHG=",J[10]
21: prt "TIME INTERVAL"
22: prt "IN MINUTES",J[21]
23: ent J[21];prt J[21];J[21]→A[2]
24: "PG":F[29]→r12;prt "PAGE",F[29]
25: ent F[29];prt F[29];if R=4 and F[29]#r12;0→E[17]
26: prt "AIRCRAFT SETTING"
27: 0→J[1];(1-.00688D[11])↑5.2561537→J[13]
28: prt "IAS=1,MACH=0";ent J[32]
29: if J[32]#0 and J[32]#1;prt "ERROR",J[32];jmp -1
30: if J[32]=0;jmp 7
31: prt "ias",D[8]
32: ent D[8];prt D[8];D[8]→J[24]→J[35]
33: if D[8]>410;prt "MAX IAS 410";jmp -2
34: if D[8]<100;prt "MIN IAS 100";jmp -3
35: 'MA'(D[8],J[13])→D[71];D[71]→J[25]
36: jmp 6
37: prt "mach",D[71]
38: ent D[71];prt D[71];D[71]→J[25]→J[35]
39: if D[71]>.9;prt "MAX MACH .9";jmp -2
40: if D[71]<0;prt "NO NEG MACH";jmp -3
41: 'IS'(D[71],J[13])→D[8];D[8]→J[24]
42: prt "EPR POD",J[7]
43: ent J[7];prt J[7]
44: if J[7]>2.4;prt "MAX EPR 2.4";jmp -2
45: if J[7]<0;prt "NO NEG EPR";jmp -3
46: prt "EPR CENTER",J[8]
47: ent J[8];prt J[8]
48: if J[8]>2.4;prt "MAX EPR 2.4";jmp -2
49: if J[8]<0;prt "NO NEG EPR";jmp -3
50: if R#8;0→Z;jmp 5
51: prt "FLAPS",Z
52: ent Z;prt Z
53: if Z>40;prt "MAX FLAP 40";jmp -2
54: if Z<0;prt "MIN FLAP 0";jmp -3
55: trk 0;ldf 20,V,V+18
*13087

20: "PR-I22,OCT20":if R=8 and F[29]=1;0→D[61]→D[62]→D[63]→D[64]→D[28]→D[29]
21: if J[10]=0;gto "AA"
22: D[67]*10→r20;D[68]*10→r21;D[11]*10→r22;0→r24→r25→r26
23: if J[3]=1;gto "AB"
24: wrt 2,"                  PAS DISPLAY UNIT"
25: wrt 2,"    UPPER SCALE                    LOWER SCALE"
26: fmt 1,3x,"POD",5x,"CTR",18x,"POD LIM",3x,"CTR LIM"
27: wrt 2.1
28: fmt 1f7.3,1f9.3,1f22.3,1f10.3
29: wrt 2,D[61],D[62],D[63],D[64]
30: fmt 2,3x,"PAT",5x,"IAS",18x,"OPT ALT",3x,"MAX ALT"
31: wrt 2.2
```

```
32: fmt 1f7.2,1f7.0,1f23.0,1f10.0
33: wrt 2,D[65],D[66],r20,r21
34: if R<=3;D[12]→r23;jmp 3
35: if R=6;D[14]→r23;jmp 2
36: D[13]→r23
37: fmt 8,1/
38: wrt 2.8
39: wrt 2,"                    PAS CONTROL UNIT"
40: if R=1;"   PF  "→M$
41: if R=2;"   TO  "→M$
42: if R=3;"   CLB "→M$
43: if R=4;"   CRZ "→M$
44: if R=5;"TBC PEN"→M$
45: if R=6;"   DSNT"→M$
46: if R=7;"   HLD "→M$
47: if R=8;"   APP "→M$
48: fmt 7,3x,"MODE",3x,"PAGE",x,"DERATE",2x,"PLNG",2x,"ENG OUT"
49: wrt 2.7
50: fmt 1f5.0,4f7.0
51: wrt 2,M$,F[29],r24,r25,r26
52: wrt 2,"                          KEYS"
53: fmt 5,4x,"MACH",5x,"GS",5x,"NGM",6x,"FF",5x,"DIST",5x,"BUF"
54: wrt 2.5
55: fmt 1f8.3,1f7.0,1f8.2,1f9.2,1f8.0,1f8.1
56: wrt 2,D[1],D[2],D[3],D[4],D[5],D[6]
57: fmt 4,4x,"GW",6x,"IAS",5x,"TAT",5x,"FUEL",4x,"ALT",5x,"WIND"
58: wrt 2.4
59: fmt 1f9.1,1f6.0,1f8.1,1f9.2,1f7.0,1f8.0
60: wrt 2,D[7],D[8],D[9],D[10],r22,r23
61: fmt 3,4x,"TIME",4x,"DIST"
62: wrt 2.3
63: fmt 1f8.2,1f8.0
64: wrt 2,D[28],D[29]
65: wrt 2.8
66: "AA":wrt 2,T$,T$,T$,T$,T$,T$
67: "AB":
68: if R#1 and R#8;jmp 3
69: for I=1 to 4
70: 0→D[60+I];next I
71: 0→D[25]→D[26]→D[65]→D[66]
72: trk 0;ldf 20,V,V+5
*11284

20: "PR-II23,oct20":
21: fmt 1,3/
22: fmt 4,1/
23: wrt 2,"WELCOME TO THE"
24: wrt 2,"SIMMONDS PRECISION PRODUCTS INC - INSTRUMENT SYSTEMS DIVISION"
25: wrt 2,"PERFORMANCE ADVISARY SYSTEM/AIRCRAFT SIMULATOR"
26: wrt 2,"YOU ARE NOW THE PILOT IN-COMMAND OF A BOEING 727-231 AIRCRAFT"
27: "SP":
28: wrt 2.4
29: wrt 2,"HAVE A SAFE AND ECONOMICAL FLIGHT"
30: wrt 2,T$,T$,T$,T$,T$,T$
31: wrt 2.1
32: wrt 2,"                    PRE-FLIGHT"
33: wrt 2.1
34: wrt 2,T$,T$,T$,T$,T$,T$
35: trk 0;ldf 20,V,V+3
36: wrt 2,"FLIGHT ENDED"
37: J[11]-D[10]→J[11]
38: fmt 3,3/
39: wrt 2.3
40: wrt 2,"FLIGHT SUMMARY"
41: wrt 2,"FUEL USED = ",J[11]," THOUSAND LBS"
42: wrt 2,"TRIP DISTANCE = ",J[5]," NM"
```

```
43: wrt 2,"TRIP TIME = ",J[10]," MIN"
44: wrt 2,"THANK YOU CAPTAIN FOR A MOST ENJOYABLE FLIGHT"
45: wrt 2,"AND THANK YOU FOR FLYING WITH SIMMONDS PRECISION"
46: wrt 2,T$,T$,T$,T$,T$,T$
47: fmt 2,10/
48: wrt 2.2
49: end
50: if D[10]-D[16]>0;jmp 11
51: if D[10]>0;jmp 6
52: wrt 2.1
53: wrt 2,"OUT OF FUEL"
54: wrt 2.1
55: wrt 2,T$,T$,T$,T$,T$,T$
56: end
57: wrt 2.1
58: wrt 2,"DOWN TO RESERVE+ ALTERNATE"
59: wrt 2.1
60: wrt 2,T$,T$,T$,T$,T$,T$
61: trk 0;ldf 19,V,V+25
*3700

20: "PR-III24,oct20":
21: fmt 4,1/
22: wrt 2,"                    AIRCRAFT   DATA"
23: fmt 5,3x,"MODE",x,"TIME",2x,"ALT*",4x,"FUEL*",6x,"GW",6x,"DIST",z
24: fmt 6,6x,"ROC",6x,"ROD",5x,"THRUST"
25: wrt 2.5;wrt 2.6
26: fmt 2f5.0,7f9.3
27: wrt 2,R,J[10],D[11],D[10],J[17],J[5],J[15],J[16],J[6]
28: fmt 7,3x,"BLD*",3x,"FF",4x,"dISA",4x,"TAT*",z
29: fmt 8,5x,"DEL",5x,"IAS",7x,"MACH*",3x,"PITCH",4x,"DRAG"
30: wrt 2.7;wrt 2.8
31: fmt 1f5.0,4f8.3,4f9.3
32: wrt 2,Y,J[18],J[19],D[9],J[13],D[8],D[71],J[12],J[14]
33: fmt 9,3x,"EPR POD",2x,"EPR CTR",x,"FLAPS*",2x,"ANTI ICE*",4x,"TAS",z
34: fmt 3,7x,"TAMB"
35: wrt 2.9;wrt 2.3
36: fmt 2f9.3,1f5.0,1f10.0,1f13.3,1f9.3
37: wrt 2,J[7],J[8],Z,F[79],J[23],J[9]
38: wrt 2.4
39: gto "EX1"
*28717

20: "File27,OCT25 76":
21: dim D$[75,4],P$[75,2],G$[75,2],K$[75,2],S$[75,2],D[75]
22: dim P[75],G[75],K[75],S[75]
23: 59→D[10]
24: 100→D[15]
25: 3→D[16]
26: 36→D[21]
27: 20→D[22]
28: -40→D[23]
29: 15→D[32]
30: 26→D[33]
31: 27→D[34]
32: 28→D[35]
33: 29→D[36]
34: 30→D[37]
35: .81→D[38]
```

```
36: .82→D[39]
37: .83→D[40]
38: .84→D[41]
39: .85→D[42]
40: 31→D[43]
41: 32→D[44]
42: 33→D[45]
43: 34→D[46]
44: 35→D[47]
45: 123→D[48]
46: 234→D[49]
47: 3→D[50]
48: 3→D[51]
49: 3→D[52]
50: 3→D[53]
51: -5→D[55]
52: 34952→D[59]
53: 48059→D[60]
54: 1→D[61]
55: 2→D[62]
56: 3→D[63]
57: 4→D[64]
58: 5→D[65]
59: 6→D[66]
60: 7→D[67]
61: -32000→D[75]
62: 8→D[68]
63: "MACH"→D$[1]
64: "GSuu"→D$[2]
65: "NGMu"→D$[3]
66: "FFuu"→D$[4]
67: "DIST"→D$[5]
68: "BUFu"→D$[6]
69: "GWuu"→D$[7]
70: "IASu"→D$[8]
71: "TATu"→D$[9]
72: "FUEL"→D$[10]
73: "ALTu"→D$[11]
74: "WIND"→D$[12]
75: "WIND"→D$[13]
76: "WIND"→D$[14]
77: "TOWu"→D$[15]
78: "ALTN"→D$[16]
79: "DELV"→D$[17]
80: "DIST"→D$[18]
81: "CRZW"→D$[19]
82: "CLBW"→D$[20]
83: "TROP"→D$[21]
84: "CZFL"→D$[22]
85: "CZiC"→D$[23]
86: "RWiF"→D$[24]
87: "ASiF"→D$[25]
88: "DIST"→D$[26]
89: "TIME"→D$[27]
90: "TIME"→D$[28]
91: "DIST"→D$[29]
92: "PFuu"→D$[30]
93: "RWiF"→D$[31]
94: "ASiF"→D$[32]
95: "ECON"→D$[33]
96: "STDu"→D$[34]
97: "RATE"→D$[35]
98: "ANGL"→D$[36]
99: "ICPT"→D$[37]
100: "ECON"→D$[38]
101: "CNST"→D$[39]
102: "MAXu"→D$[40]
103: "ICPT"→D$[41]
104: "TAPu"→D$[42]
105: "ECON"→D$[43]
106: "STDu"→D$[44]
107: "RATE"→D$[45]
108: "ANGL"→D$[46]
109: "ICPT"→D$[47]
110: "LINR"→D$[48]
111: "TURN"→D$[49]
112: "VREF"→D$[50]
113: "AuG)"→D$[51]
114: "AuGa"→D$[52]
115: "REPR"→D$[53]
116: "OAiT"→D$[54]
117: "WIND"→D$[55]
118: "PFOK"→D$[56]
119: "GOPF"→D$[57]
120: "FAIL"→D$[58]
121: "uuuv"→D$[59]
122: "ENGh"→D$[60]
123: "PFu "→D$[61]
124: "TOu "→D$[62]
125: "TOR "→D$[63]
126: "CLB "→D$[64]
127: "CLR "→D$[65]
128: "CRZ "→D$[66]
129: "TAP "→D$[67]
130: "DST "→D$[68]
131: "HLD "→D$[69]
132: "APP "→D$[70]
133: "AFF "→D$[71]
134: "AFF "→D$[72]
135: "OuPF"→D$[73]
136: 3→P[1]
137: 0→P[2]
138: 2→P[3]
139: 0→P[4]
140: 0→P[5]
141: 2→P[6]
142: 1→P[7]
143: 0→P[8]
144: 1→P[9]
145: 1→P[10]
146: 1→P[11]
147: 0→P[12]
148: 0→P[13]
149: 0→P[14]
150: 1→P[15]
151: 1→P[16]
152: 0→P[17]
153: 0→P[18]
154: 0→P[19]
155: 0→P[20]
156: 0→P[21]
157: 1→P[22]
158: 0→P[23]
159: 0→P[24]
160: 0→P[25]
161: 0→P[26]
162: 0→P[27]
163: 0→P[28]
164: 0→P[29]
165: 0→P[30]
166: 0→P[31]
167: 0→P[32]
168: 1→P[33]
169: 1→P[34]
170: 1→P[35]
171: 1→P[36]
172: 1→P[37]
173: 3→P[38]
174: 3→P[39]
175: 3→P[40]
176: 3→P[41]
177: 3→P[42]
178: 1→P[43]
179: 1→P[44]
180: 1→P[45]
181: 1→P[46]
182: 1→P[47]
183: 0→P[48]
184: 0→P[49]
185: 0→P[50]
186: 1→P[51]
187: 1→P[52]
188: 0→P[53]
189: 0→P[54]
190: 0→P[55]
191: 0→P[56]
192: 0→P[57]
193: 0→P[58]
194: 0→P[59]
195: 0→P[60]
196: 3→P[61]
197: 3→P[62]
198: 3→P[63]
199: 3→P[64]
200: 2→P[65]
201: 0→P[66]
202: 2→P[67]
203: 1→P[68]
204: -100→P[69]
205: 0→P[70]
206: 0→P[71]
207: -1000→P[72]
208: -1000→P[73]
209: 0→P[74]
210: 0→P[75]
211: 900→G[1]
212: 600→G[2]
213: 9900→G[3]
214: 9900→G[4]
215: 3000→G[5]
216: 900→G[6]
217: 2000→G[7]
218: 450→G[8]
219: 600→G[9]
220: 590→G[10]
221: 500→G[11]
222: 150→G[12]
223: 150→G[13]
224: 150→G[14]
225: 1800→G[15]
226: 200→G[16]
227: 6000→G[17]
228: 3000→G[18]
229: 150→G[19]
230: 150→G[20]
231: 50→G[21]
232: 500→G[22]
233: 70→G[23]
234: 130→G[24]
```

```
235: 130→G[25]
236: 3000→G[26]
237: 700→G[27]
238: 700→G[28]
239: 3000→G[29]
240: 0→G[30]
241: 130→G[31]
242: 130→G[32]
243: 500→G[33]
244: 500→G[34]
245: 500→G[35]
246: 500→G[36]
247: 500→G[37]
248: 1000→G[38]
249: 1000→G[39]
250: 1000→G[40]
251: 1000→G[41]
252: 1000→G[42]
253: 500→G[43]
254: 500→G[44]
255: 500→G[45]
256: 500→G[46]
257: 500→G[47]
258: 700→G[48]
259: 700→G[49]
260: 450→G[50]
261: 300→G[51]
262: 300→G[52]
263: 9999→G[53]
264: 70→G[54]
265: 150→G[55]
266: 0→G[56]
267: 0→G[57]
268: 0→G[58]
269: 0→G[59]
270: 65535→G[60]
271: 2500→G[61]
272: 2500→G[62]
273: 2500→G[63]
274: 2500→G[64]
275: 4500→G[65]
276: 900→G[66]
277: 5000→G[67]
278: 500→G[68]
279: 60→G[69]
280: 450→G[70]
281: 1→G[71]
282: 50→G[72]
283: 60→G[73]
284: 60→G[74]
285: 8000→G[75]
286: 0→K[1]
287: 0→K[2]
288: 0→K[3]
289: 0→K[4]
290: 0→K[5]
291: 100→K[6]
292: 800→K[7]
293: 0→K[8]
294: -700→K[9]
295: 0→K[10]
296: -20→K[11]
297: -150→K[12]
298: -150→K[13]
299: -150→K[14]
300: 800→K[15]
301: 0→K[16]
302: -999→K[17]
303: 0→K[18]
304: -150→K[19]
305: -150→K[20]
306: 20→K[21]
307: 0→K[22]
308: -70→K[23]
309: -70→K[24]
310: -70→K[25]
311: 0→K[26]
312: 0→K[27]
313: 0→K[28]
314: 0→K[29]
315: 0→K[30]
316: -70→K[31]
317: -70→K[32]
318: 0→K[33]
319: 0→K[34]
320: 0→K[35]
321: 0→K[36]
322: 0→K[37]
323: 0→K[38]
324: 0→K[39]
325: 0→K[40]
326: 0→K[41]
327: 0→K[42]
328: -20→K[43]
329: -20→K[44]
330: -20→K[45]
331: -20→K[46]
332: -20→K[47]
333: 0→K[48]
334: 0→K[49]
335: 0→K[50]
336: 0→K[51]
337: 0→K[52]
338: 0→K[53]
339: -70→K[54]
340: -150→K[55]
341: 0→K[56]
342: 0→K[57]
343: 0→K[58]
344: 0→K[59]
345: 0→K[60]
346: 0→K[61]
347: 0→K[62]
348: 0→K[63]
349: 0→K[64]
350: -4500→K[65]
351: 0→K[66]
352: 0→K[67]
353: 0→K[68]
354: -70→K[69]
355: 0→K[70]
356: 0→K[71]
357: -2→K[72]
358: 0→K[73]
359: for N=1 to 68;1→S[N];next N
360: 1000→S[1]
361: 100→S[3]
362: 1000→S[4]
363: 100→S[6]
364: 10→S[7]
365: 10→S[9]
366: 10→S[10]
367: 10→S[11]
368: 10→S[15]
```

```
369: 10→S[16]
370: 10→S[22]
371: 1→S[23]
372: 1→S[24]
373: 1→S[25]
374: 1→S[31]
375: 1→S[32]
376: 10→S[33]
377: 10→S[34]
378: 10→S[35]
379: 10→S[36]
380: 10→S[37]
381: 1000→S[38]
382: 1000→S[39]
383: 1000→S[40]
384: 1000→S[41]
385: 1000→S[42]
386: 10→S[43]
387: 10→S[44]
388: 10→S[45]
389: 10→S[46]
390: 10→S[47]
391: 10→S[51]
392: 10→S[52]
393: 1→S[53]
394: 1→S[54]
395: 1000→S[61]
396: 1000→S[62]
397: 1000→S[63]
398: 1000→S[64]
399: 100→S[65]
400: 100→S[67]
401: 10→S[68]
402: 1→S[73]
403: sfg 14;for J=1 to 75
404: fti (P[J])→P$[J]
405: fti (G[J])→G$[J]
406: fti (K[J])→K$[J]
407: fti (S[J])→S$[J]
408: next J
409: rcf 1,D$,P$,G$,K$,S$,D[*]
410: trk 0
411: end
*11837

20: "File28,OCT20 1976":
21: "F":
22: dim F[100],M[47],U[27]
23: 1→F[10]
24: 3→F[11]
25: 5→F[12]
26: 6→F[13]
27: 7→F[14]
28: 8→F[15]
29: 9→F[16]
30: 0→F[17]
31: 1→F[18]
32: 3→F[19]
33: 8→F[20]
34: 12→F[21]
35: 13→F[22]
```

```
36: 18→F[23]
37: 20→F[24]
38: 3100→F[26]
39: 0→F[27]
40: 3695→F[28]
41: 1→F[29]
42: 3→F[30]
43: 1→F[33]
44: 2→F[34]
45: 2→F[35]
46: 2→F[36]
47: 1→F[37]
48: 2→F[38]
49: 2→F[39]
50: 2→F[40]
51: 1→F[42]
52: 1→F[43]
53: 1→F[44]
54: 1→F[45]
55: 2→F[47]
56: 2→F[48]
57: 2→F[49]
58: 2→F[50]
59: 2→F[51]
60: 2→F[52]
61: 3→F[53]
62: 1→F[54]
63: 3→F[55]
64: 1→F[56]
65: 1→F[57]
66: 1→F[58]
67: 2→F[59]
68: 2→F[60]
69: 2→F[61]
70: 2→F[62]
71: 2→F[63]
72: 2→F[66]
73: 2→F[67]
74: 13→F[68]
75: 33→F[69]
76: 13→F[70]
77: 2→F[72]
78: 7→F[73]
79: 5→F[74]
80: 5→F[75]
81: 5→F[76]
82: 4→F[77]
83: 4→F[78]
84: -1.8→F[79]
85: 200→F[80]
86: .2→F[81]
87: 0→F[82]
88: 180→F[83]
89: 1000→F[84]
90: 1→F[85]
91: 135→F[86]
92: 91.8→F[87]
93: 800→F[88]
94: .8→F[89]
95: 67.5→F[90]
96: 360/8191*.5→F[91]
97: 360/8191*1/.36→F[92]
98: 360/8191*1/360→F[93]
99: 360/8191*5/360→F[94]
100: 360/8191*5*27/360→F[95]
101: 1→F[96]
```

```
102: 20→F[97]
103: .1→F[98]
104: .1→F[99]
105: .01→F[100]
106: 1→M[1]
107: 2→M[2]
108: 4→M[3]
109: 8→M[4]
110: 16→M[5]
111: 32→M[6]
112: 64→M[7]
113: 128→M[8]
114: 256→M[9]
115: 512→M[10]
116: 1024→M[11]
117: 2048→M[12]
118: 4096→M[13]
119: 8192→M[14]
120: 16384→M[15]
121: 32768→M[16]
122: 15→M[17]
123: 240→M[18]
124: 3840→M[19]
125: 61440→M[20]
126: 1→M[21]
127: 1→M[22]
128: 1→M[33]
129: 1→M[34]
130: 16→M[46]
131: 80→M[47]
132: 0→M[37]
133: 4075→M[43]
134: 1→M[38]
135: 12→M[44]
136: 76→M[45]
137: rcf 2,F[*],M[*],U[*]
138: end
*15311

20: "trk 0, File 29 SEP14 1976":
21: "A,B,C,I,H":
22: dim A[158],B[158],C[158],H[33]
23: dim A$[158,4],B$[158,4],C$[158,4],M$[10]
24: 5.8082e1→A[1]
25: -1.17214e1→B[1]
26: -9.68262e-1→C[1]
27: 8.37429e1→A[2]
28: -9.81429e0→B[2]
29: 7.14286e-2→C[2]
30: 2.19604e0→A[3]
31: -2.89605e-3→B[3]
32: -7.91203e-6→C[3]
33: 2.40515e0→A[4]
34: -4.57521e-3→B[4]
35: -2.90164e-6→C[4]
36: 2.7766e-1→A[5]
37: 7.45208e-1→B[5]
38: 6.73992e-2→C[5]
39: -4.43306e-2→A[6]
40: 1.048374e0→B[6]
41: -1.75828e-2→C[6]
42: 0→A[7]
43: 0→B[7]
44: 0→C[7]
45: 1.78625e1→A[8]
46: -6.83131e0→B[8]
47: -5.1738e-1→C[8]
48: 2.87606e-2→A[9]
49: -2.9594e0→B[9]
50: -1.08472e0→C[9]
51: 3.19e1→A[10]
52: -5.4e0→B[10]
53: 0→C[10]
54: 2.13818e0→A[11]
55: -6.73913e-3→B[11]
56: -4.60548e-5→C[11]
57: 2.02668e0→A[12]
58: -9.53821e-3→B[12]
59: -7.19643e-5→C[12]
60: 1.987e0→A[13]
61: -6.38e-3→B[13]
62: 0→C[13]
63: 2.40302→A[14]
64: -1.39636e-2→B[14]
65: 5.57116e-5→C[14]
66: 7.65449e-3→A[15]
67: 9.96223e-1→B[15]
68: -3.22129e-3→C[15]
69: 1.73804e1→A[16]
70: -6.40938e0→B[16]
71: -5.8482e-1→C[16]
72: 2.00502e0→A[17]
73: -4.18197e0→B[17]
74: -9.69754e-1→C[17]
75: 3.18667e1→A[18]
76: 5.40085→B[18]
77: 4.26439e-3→C[18]
78: 2.09087e0→A[19]
79: -6.61732e-3→B[19]
80: -4.53877e-5→C[19]
81: 1.98018e0→A[20]
82: -9.50893e-3→B[20]
83: -7.58929e-5→C[20]
84: 1.9492→A[21]
85: -7.25286e-3→B[21]
86: 2.07143e-5→C[21]
87: 2.52087→A[22]
88: -2.1431e-2→B[22]
89: 1.40282e-4→C[22]
90: 2.87143e-2→A[23]
91: 9.7631e-1→B[23]
92: 1.19048e-3→C[23]
93: 8.28571e-2→A[24]
94: 8.975e-1→B[24]
95: 2.5e-2→C[24]
96: 4.61429e-2→A[25]
97: 9.15714e-1→B[25]
98: 2.14286e-2→C[25]
99: -1.06429e-1→A[26]
100: 1.06964e0→B[26]
101: -1.78571e-2→C[26]
102: -1.84279e1→A[27]
103: 2.1575e1→B[27]
104: -2.62916e0→C[27]
105: -1.67022e1→A[28]
106: 1.91345e1→B[28]
107: -2.06732e0→C[28]
108: -1.48577e1→A[29]
109: 1.67712e1→B[29]
```

```
110: -1.51069e0→C[29]
111: -1.1713e1→A[30]
112: 1.27937e1→B[30]
113: -4.11122e-1→C[30]
114: -1.1713e1→A[31]
115: 1.27937e1→B[31]
116: -4.11122e-1→C[31]
117: -1.13226e1→A[32]
118: 1.22376e1→B[32]
119: -1.66446e-1→C[32]
120: -1.11283e1→A[33]
121: 1.21334e1→B[33]
122: -5.19487e-2→C[33]
123: -1.024e1→A[34]
124: 1.10239e1→B[34]
125: 4.50854e-1→C[34]
126: -8.67051e0→A[35]
127: 9.36748e0→B[35]
128: 1.11592e0→C[35]
129: -1.05994e1→A[36]
130: 1.17777e1→B[36]
131: 6.95063e-1→C[36]
132: -1.02496e1→A[37]
133: 1.14725e1→B[37]
134: 1.11498e0→C[37]
135: 9.95134e-1→A[38]
136: 5.0998e-2→B[38]
137: 1.4149e-3→C[38]
138: 9.83814e-1→A[39]
139: 6.14682e-2→B[39]
140: 1.15134e-3→C[39]
141: 9.80876e-1→A[40]
142: 6.81468e-2→B[40]
143: 9.96682e-4→C[40]
144: 9.66418e-1→A[41]
145: 7.53698e-2→B[41]
146: 7.15786e-4→C[41]
147: 9.44806e-1→A[42]
148: 8.29239e-2→B[42]
149: 2.7541e-4→C[42]
150: 9.37184e-1→A[43]
151: 8.38438e-2→B[43]
152: 1.02108e-4→C[43]
153: 9.20822e-1→A[44]
154: 8.30811e-2→B[44]
155: 2.90464e-5→C[44]
156: 8.99157e-1→A[45]
157: 8.27726e-2→B[45]
158: -1.26258e-4→C[45]
159: 8.43713e-1→A[46]
160: 8.70964e-2→B[46]
161: -5.11419e-4→C[46]
162: 8.57108e-1→A[47]
163: 7.67036e-2→B[47]
164: -2.57891e-4→C[47]
165: 8.27924e-1→A[48]
166: 7.42556e-2→B[48]
167: -3.45496e-4→C[48]
168: -1.93623e1→A[49]
169: 2.28731e1→B[49]
170: -3.11208e0→C[49]
171: -1.69697e1→A[50]
172: 1.94972e1→B[50]
173: -2.24184e0→C[50]
174: -1.52581e1→A[51]
175: 1.73094e1→B[51]
176: -1.73766e0→C[51]
177: -1.36092e1→A[52]
178: 1.51997e1→B[52]
179: -1.18375e0→C[52]
180: -1.25347e1→A[53]
181: 1.37189e1→B[53]
182: -7.26929e-1→C[53]
183: -1.14365e1→A[54]
184: 1.24972e1→B[54]
185: -3.28455e-1→C[54]
186: -1.06665e1→A[55]
187: 1.15331e1→B[55]
188: 6.32234e-2→C[55]
189: -1.01783e1→A[56]
190: 1.10489e1→B[56]
191: 3.50604e-1→C[56]
192: -1.05486e1→A[57]
193: 1.1661e1→B[57]
194: 3.84593e-1→C[57]
195: -1.06989e1→A[58]
196: 1.20383e1→B[58]
197: 5.21563e-1→C[58]
198: -1.06433e1→A[59]
199: 1.205e1→B[59]
200: 8.46375e-1→C[59]
201: 9.91412e-1→A[60]
202: 5.09459e-2→B[60]
203: 1.58171e-3→C[60]
204: 9.91858e-1→A[61]
205: 5.99959e-2→B[61]
206: 1.35254e-3→C[61]
207: 9.84314e-1→A[62]
208: 6.75959e-2→B[62]
209: 1.17147e-3→C[62]
210: 9.71955e-1→A[63]
211: 7.52038e-2→B[63]
212: 8.48406e-4→C[63]
213: 9.64232e-1→A[64]
214: 8.02878e-2→B[64]
215: 5.09492e-4→C[64]
216: 9.38373e-1→A[65]
217: 8.40506e-2→B[65]
218: 2.17809e-4→C[65]
219: 9.24713e-1→A[66]
220: 8.23382e-2→B[66]
221: 1.61703e-4→C[66]
222: 8.95943e-1→A[67]
223: 8.54789e-2→B[67]
224: -1.94692e-4→C[67]
225: 8.79258e-1→A[68]
226: 8.09075e-2→B[68]
227: -1.80787e-4→C[68]
228: 8.57186e-1→A[69]
229: 7.70956e-2→B[69]
230: -2.06055e-4→C[69]
231: 8.34899e-1→A[70]
232: 7.38228e-2→B[70]
233: -2.76026e-4→C[70]
234: 8.48838e-1→A[71]
235: -2.84631→B[71]
236: 1.08283→C[71]
237: 5.41461e-1→A[72]
238: -1.43231→B[72]
239: -1.05519e-1→C[72]
240: 4.02403e-1→A[73]
241: -1.51201→B[73]
242: 1.0487→C[73]
243: 4.65309e-1→A[74]
244: -1.08822→B[74]
245: 3.84861e-1→C[74]
246: 2.63465e-1→A[75]
247: 3.98401e-1→B[75]
248: -1.25586→C[75]
249: 1.21116→A[76]
250: -2.84541→B[76]
251: 1.19186→C[76]
252: 1.23159→A[77]
253: -2.27875→B[77]
254: 7.45423e-1→C[77]
255: 2.80417e-1→A[78]
256: 4.92209e-1→B[78]
257: -7.39988e-1→C[78]
258: 1.939→A[79]
259: -7.93571e-3→B[79]
260: -4.64286e-5→C[79]
261: 1.9127→A[80]
262: -1.09859e-2→B[80]
263: 5.61524e-5→C[80]
264: 1.89061→A[81]
265: -8.1075e-3→B[81]
266: -5.23214e-5→C[81]
267: 1.85217→A[82]
268: -1.0165e-2→B[82]
269: 5.08682e-5→C[82]
270: 4.61221e-1→A[83]
271: 9.96317→B[83]
272: 1.29708→C[83]
273: 1.636→A[84]
274: 6.30071→B[84]
275: 1.66071→C[84]
276: 6.75123e-1→A[85]
277: 6.29503→B[85]
278: 1.56549→C[85]
279: 1.02422e-1→A[86]
280: 5.49811→B[86]
281: 1.85022→C[86]
282: -1.42398→A[87]
283: 6.25816→B[87]
284: 1.29742→C[87]
285: -2.91722→A[88]
286: 6.64846→B[88]
287: 8.69142e-1→C[88]
288: -4.97831→A[89]
289: 7.13458→B[89]
290: 7.18098e-1→C[89]
291: 8.554e1→A[90]
292: 3.61737e-1→B[90]
293: 1.41549e-4→C[90]
294: 5.88956e1→A[91]
295: 4.63767e-1→B[91]
296: 1.69218e-4→C[91]
297: 2.66291e-1→A[92]
298: 1.55055e-2→B[92]
299: -1.11905e-4→C[92]
300: 1.67137e-1→A[93]
301: 1.33052e-2→B[93]
302: -7.14927e-5→C[93]
303: -2.73747e2→A[94]
304: 1.63857e3→B[94]
305: -5.31281e1→C[94]
306: -1.19487e4→A[95]
307: 3.35562e4→B[95]
308: -2.18568e4→C[95]
309: 6.09981e2→A[96]
```

```
310: -1.03138e1→B[96]
311: 4.94597e-2→C[96]
312: 3.79478e2→A[97]
313: 2.03828→B[97]
314: -2.91718e-2→C[97]
315: 2.67126e1→A[98]
316: -1.13774→B[98]
317: 1.27049e-2→C[98]
318: -2.66364e1→A[99]
319: 9.92424→B[99]
320: 3.74621e3→C[99]
321: -5.30617e-2→A[100]
322: 6.33236e-2→B[100]
323: 2.66863e-3→C[100]
324: 1.46206e-2→A[101]
325: 5.61732e-3→B[101]
326: 5.49484e-2→C[101]
327: 8.41285e-2→A[102]
328: -8.09e-2→B[102]
329: 8.41063e-2→C[102]
330: 8.79188e-2→A[103]
331: -7.24166e-2→B[103]
332: 7.65902e-2→C[103]
333: 1.10436e-1→A[104]
334: -1.00774e-1→B[104]
335: 8.48976e-2→C[104]
336: 1.19349e-1→A[105]
337: -8.75652e-2→B[105]
338: 7.60283e-2→C[105]
339: 1.39601e-1→A[106]
340: -9.56609e-2→B[106]
341: 7.786e-2→C[106]
342: 1.58721e-1→A[107]
343: -9.3176e-2→B[107]
344: 7.42517e-2→C[107]
345: 3.04155e-2→A[108]
346: -3.68515e-3→B[108]
347: -1.32335e-3→C[108]
348: 2.42092e-2→A[109]
349: -2.07737e-3→B[109]
350: 1.86766e-4→C[109]
351: 2.19574e-2→A[110]
352: -1.0883e-3→B[110]
353: 2.34459e-4→C[110]
354: 2e-2→A[111]
355: 0→B[111]
356: 0→C[111]
357: 1.72791e-2→A[112]
358: 3.08356e-4→B[112]
359: 5.40104e-5→C[112]
360: 1.50154e-2→A[113]
361: 8.60745e-4→B[113]
362: -1.65389e-4→C[113]
363: 1.02669e-2→A[114]
364: 2.69494e-3→B[114]
365: -4.76987e-4→C[114]
366: 1.81529e-2→A[115]
367: -4.10471e-3→B[115]
368: 6.02524e-2→C[115]
369: 1.84102e-2→A[116]
370: -5.9903e-3→B[116]
371: 6.71594e-2→C[116]
372: 1.81966e-2→A[117]
373: -3.96157e-3→B[117]
374: 6.49696e-2→C[117]
375: 1.89007e-2→A[118]
376: -1.02618e-2→B[118]
377: 8.04581e-2→C[118]
378: 1.94059e-2→A[119]
379: -1.53786e-2→B[119]
380: 9.64458e-2→C[119]
381: 2.00936e-2→A[120]
382: -2.11355e-2→B[120]
383: 1.16923e-1→C[120]
384: 2.20357e-2→A[121]
385: -3.62184e-2→B[121]
386: 1.6424e-1→C[121]
387: 9.10857e-1→A[122]
388: -3.34857e-2→B[122]
389: 2.28571e-4→C[122]
390: 9.52922e-1→A[123]
391: -3.65844e-2→B[123]
392: 4.62338e-4→C[123]
393: 1.08041→A[124]
394: -5.60277e-2→B[124]
395: 1.37228e-3→C[124]
396: 1.07252→A[125]
397: -4.48443e-2→B[125]
398: 1.03369e-3→C[125]
399: 1.20989→A[126]
400: -4.68945e-2→B[126]
401: 5.91277e-4→C[126]
402: 1.40086→A[127]
403: -5.41429e-2→B[127]
404: 6.57143e-4→C[127]
405: 1.84284→A[128]
406: -6.96793e-2→B[128]
407: 8.12783e-4→C[128]
408: 1.04803→A[129]
409: -5.29992e-2→B[129]
410: 2.49181e-3→C[129]
411: 1.23405→A[130]
412: -6.46822e-2→B[130]
413: 2.72493e-3→C[130]
414: 1.41229→A[131]
415: -7.72209e-2→B[131]
416: 2.99405e-3→C[131]
417: 1.02977→A[132]
418: -4.70098e-2→B[132]
419: 2.25245e-3→C[132]
420: 1.19422→A[133]
421: -5.41873e-2→B[133]
422: 2.29683e-3→C[133]
423: 1.45793→A[134]
424: -7.90738e-2→B[134]
425: 3.01844e-3→C[134]
426: 1.03717→A[135]
427: -4.41155e-2→B[135]
428: 2.08318e-3→C[135]
429: 1.27718→A[136]
430: -6.53853e-2→B[136]
431: 2.70833e-3→C[136]
432: 1.43788→A[137]
433: -7.27531e-2→B[137]
434: 2.7017e-3→C[137]
435: 1.12226→A[138]
436: -5.5718e-2→B[138]
437: 2.50368e-3→C[138]
438: 1.20877→A[139]
439: -5.37929e-2→B[139]
440: 2.24435e-3→C[139]
441: 1.3937→A[140]
442: -6.5644e-2→B[140]
443: 2.42515e-3→C[140]
444: 1.1984→A[141]
445: -5.16312e-2→B[141]
446: 2.05674e-3→C[141]
447: 1.12291→A[142]
448: -3.39537e-2→B[142]
449: 1.44521e-3→C[142]
450: 1.35897→A[143]
451: -5.34774e-2→B[143]
452: 1.90201e-3→C[143]
453: 1.01349→A[144]
454: -4.85113e-2→B[144]
455: 2.27701e-3→C[144]
456: 1.21788→A[145]
457: -6.4391e-2→B[145]
458: 2.70833e-3→C[145]
459: 1.43115→A[146]
460: -8.52564e-2→B[146]
461: 3.33333e-3→C[146]
462: 1.11344→A[147]
463: -6.35867e-2→B[147]
464: 2.87374e-3→C[147]
465: 1.30048→A[148]
466: -7.55339e-2→B[148]
467: 3.08101e-3→C[148]
468: 1.45899→A[149]
469: -8.40075e-2→B[149]
470: 3.18467e-3→C[149]
471: 1.05525→A[150]
472: -5.00625e-2→B[150]
473: 2.26563e-3→C[150]
474: 1.28025→A[151]
475: -6.81875e-2→B[151]
476: 2.73438e-3→C[151]
477: 1.451→A[152]
478: -7.775e-2→B[152]
479: 2.8125e-3→C[152]
480: 1.02422→A[153]
481: -4.4975e-2→B[153]
482: 2.093e-3→C[153]
483: 1.1583→A[154]
484: -4.91812e-2→B[154]
485: 2.0374e-3→C[154]
486: 1.34849→A[155]
487: -6.32531e-2→B[155]
488: 2.33752e-3→C[155]
489: 1.03726→A[156]
490: -4.31611e-2→B[156]
491: 2.02778e-3→C[156]
492: 1.23517→A[157]
493: -5.6371e-2→B[157]
494: 2.27034e-3→C[157]
495: 1.36633→A[158]
496: -6.08051e-2→B[158]
497: 2.20169e-3→C[158]
498: 11→H[1]
499: 0→H[2]
500: .1→H[3]
501: 5→H[4]
502: 0→H[5]
503: 10→H[6]
504: 7→H[7]
505: 0→H[8]
506: 5→H[9]
507: 4→H[10]
508: 0→H[11]
509: .2→H[12]
```

```
510: 3→H[13]
511: .6→H[14]
512: .2→H[15]
513: 2→H[16]
514: .7→H[17]
515: .06→H[18]
516: 6→H[19]
517: .76→H[20]
518: .02→H[21]
519: 3→H[22]
520: .4→H[23]
521: .2→H[24]
522: 5→H[25]
523: 0→H[26]
524: 10→H[27]
525: 3→H[28]
526: 29→H[29]
527: 4→H[30]
528: 3→H[31]
529: 20→H[32]
530: 10→H[33]
531: for J=1 to 158
532: fts (A[J])→A$[J]
533: fts (B[J])→B$[J]
534: fts (C[J])→C$[J]
535: next J
536: 0→L
537: prt "PRINTOUT-yes/no";ent M$
538: if M$="yes";1→L
539: if L=0;gto "WRITEFILE"
540: wrt 6,"     *           A[*]            B[*]            C[*]"
541: for J=1 to 158
542: fmt 1f4.0,3e20.7
543: wrt 6,J,A[J],B[J],C[J]
544: next J
545: wrt 6," H[*]         # OF CURVES INITIAL VALUE   DELTA VALUE"
546: for J=1 to 11
547: 3J-2→K
548: fmt 1f4.0,1f20.0,2f15.2
549: wrt 6,K,H[K],H[K+1],H[K+2]
550: next J
551: "WRITEFILE":
552: rcf 3,H[*],A$,B$,C$
553: end
*27948

20: "TRK0,F30,SEP14,1976":
21: dim A[25],E[20],J[40],Y[7]
22: 1560→A[1]
23: 0→A[2]
24: 0→A[3]
25: 0→A[4]
26: 0→A[5]
27: 0→A[6]
28: 0→A[7]
29: 0→A[8]
30: .75→A[9]
31: 700→A[10]
32: 340→A[11]
33: .8→A[12]
34: 3→A[13]
35: 25→A[14]
```

```
36: 340→A[15]
37: .8→A[16]
38: 10→A[17]
39: 44.8→A[18]
40: 4.39→A[19]
41: .8→A[20]
42: 280→A[21]
43: 340→A[22]
44: .8→A[23]
45: 1.3→A[24]
46: 600→A[25]
47: rcf 4,A[*],E[*],J[*],Y[*]
48: trk 1;rcf 70,J[*];trk 0
49: end
*6501

20: "M31OCT25":on err "E"
21: trk 0;prt "trk=",T
22: ent "NEW=1, OLD=0",N
23: "S":if N=1;rew;jmp 2
24: fdf 0
25: if T=1;gto "S1"
26: ent "OTHER=1,PAS=0",A;if A=1;gto "M"
27: mrk 1,800
28: fdf 1;mrk 1,2300
29: fdf 2;mrk 1,1400
30: fdf 3;mrk 1,3200
31: fdf 4;mrk 1,800
32: fdf 5;mrk 1,6600
33: fdf 6;mrk 1,6100
34: fdf 7;mrk 1,700
35: fdf 8;mrk 1,1800
36: fdf 9;mrk 1,1200
37: fdf 10;mrk 1,1800
38: fdf 11;mrk 2,1700
39: fdf 13;mrk 1,700
40: fdf 14;mrk 1,1700
41: fdf 15;mrk 1,700
42: fdf 16;mrk 1,1300
43: fdf 17;mrk 1,1200
44: fdf 18;mrk 1,1600
45: fdf 19;mrk 1,1200
46: fdf 20;mrk 2,1000
47: fdf 22;mrk 5,1700
48: fdf 27;mrk 1,6000
49: fdf 28;mrk 1,2000
50: fdf 29;mrk 1,9000
51: fdf 30;mrk 21,1200
52: fdf 51;mrk 5,7000
53: 1→T;ent "1=tlist;0=no",A;if A#1;jmp 3
54: rew
55: tlist
56: ent "0=DONE;1=trk1",A;if A=0;gto "D"
57: if T#1;gto "D"
58: trk 1
59: gto "S"
60: "S1":
61: mrk 60,326
62: fdf 60;mrk 1,1800
63: fdf 61;mrk 1,800
64: fdf 62;mrk 1,1000
65: fdf 63;mrk 1,1500
```

```
66: fdf 64;mrk 1,1700
67: fdf 65;mrk 1,1600
68: fdf 66;mrk 1,1200
69: fdf 67;mrk 1,1400
70: fdf 68;mrk 2,800
71: fdf 70;mrk 231,326
72: rew;ent "1=tlist;0=no",A;if A=0;jmp 2
73: tlist;rew
74: sto "D"
75: "M":ent "trk 0=0; trk 1=1; done=2",T
76: if T#0 or T#1;sto "D"
77: ent "#FILE",N
78: if N=0;jmp 5
79: ent "FILE SIZE",S
80: if S=0;jmp -1
81: mrk N,S,X
82: fdf X+1;jmp -5
83: rew
84: tlist
85: rew;sto "M"
86: "E":prt "TRK=",T;prt "FILE=",N;jmp -3
87: "D":dsp "MRK DONE";trk 0
88: end
*10188
```

```
20: "AUTO COPY TAPE,t0f32; SEP 14,1976":fxd 0
21: on err "ERR"
22: for I=0 to 1;trk I;prt "trk=",I
23: "S":ent "START FILE#,DONE=-1",S
24: if S=-1;sto "DONE"
25: ent "LAST FILE#",L
26: if L<S;jmp -1
27: for J=S to L
28: dsp "LOAD MOTHER TAPE & cont";stp
29: ldf J,22,10
30: prt J
31: dsp "LOAD NEW TAPE & cont";stp
32: rcf J,22
33: next J
34: sto "S"
35: "ERR":
36: on err "ERR";jmp -3
37: "DONE":prt "DONE TRK#",r0
38: ent "LOAD NEW TAPE for TLIST 1=yes",A;if A#1;jmp 2
39: rew;tlist
40: next I
41: rew;end
*26798
```

```
20: "AUTO LIST TAPE,t0f33; SEPT14,1976":fxd 0
21: on err "ERR"
22: for I=0 to 1
23: trk I;prt "trk=",I
24: "S":ent "START FILE#,DONE=-1",S
25: if S=-1;sto "DONE"
26: ent "LAST FILE#",L
27: if L<S;jmp -1
```

```
28: for J=S to L
29: ldf J,20,10
30: prt J
31: list #2,20,1000
32: next J
33: gto "S"
34: "ERR":
35: on err "ERR";jmp -3
36: "DONE":prt "DONE TRK#",r0
37: next I
38: rew
39: end
*1622
```

```
20: "PRINT FLIGHT DATA 34,SEPT28, 1976":
21: dim J[40]
22: dim N$[40,11]
23: ldf 35,N$
24: fxd 0
25: fmt 2/;wrt 2;trk 1
26: ent "NO OF RECORDS",R
27: if R<=0 or R>350;jmp -1
28: for I=0 to 5
29: fmt f5;wrt 2,"FLIGHT DATA PAGE",I+1
30: fmt 6x,z;wrt 2
31: for J=6I+1 to 6I+6
32: fmt 1x,c11,z
33: if J>40;jmp 2
34: wrt 2,N$[J]
35: next J
36: fmt 1/;wrt 2
37: for K=1 to R;if K=60;71→K
38: ldf K,J[*]
39: for J=6I+1 to 6I+6
40: fmt f3.0,6f12.3
41: if J>40;jmp 2.
42: wrt 2,K,J[6I+1],J[6I+2],J[6I+3],J[6I+4],J[6I+5],J[6I+6]
43: next K
44: fmt /;wrt 2
45: next I
46: trk 0
47: end
*27109
```

```
20: "PRINT AC FLIGHT DATA 36,SEPT28, 1976":
21: dim J[40]
22: dim N$[40,11]
23: ldf 38,N$
24: fxd 0
25: fmt 2/;wrt 2;trk 1
26: ent "NO OF RECORDS",R
27: if R<=0 or R>350;jmp -1
28: for I=0 to 5
29: fmt f5;wrt 2,"FLIGHT DATA PAGE",I+1
30: fmt 6x,z;wrt 2
31: for J=6I+1 to 6I+6
32: fmt 1x,c11,z
```

```
33: if J>40;jmp 2
34: wrt 2,N$[J]
35: next J
36: fmt 1/;wrt 2
37: for K=1 to R
38: ldf K,J[*]
39: for J=6I+1 to 6I+6
40: fmt f3.0,6f12.3
41: if J>40;jmp 2
42: wrt 2,K,J[6I+1],J[6I+2],J[6I+3],J[6I+4],J[6I+5],J[6I+6]
43: next K
44: fmt /;wrt 2
45: next I
46: trk 0
47: end
*13625
```

```
20: "37sept25":
21: dim N$[40,11]
22: "   TIME,SEC  "→N$[1]
23: "   MODE #    "→N$[2]
24: "CMD EPR POD"→N$[3]
25: "CMD EPR CTR"→N$[4]
26: "EPR LIM POD"→N$[5]
27: "EPR LIM CTR"→N$[6]
28: "CMD PITCH A"→N$[7]
29: "   CMD IAS   "→N$[8]
30: "   OPT ALT   "→N$[9]
31: "   MAX ALT   "→N$[10]
32: "   CMD MACH  "→N$[11]
33: "   CMD GS    "→N$[12]
34: "   CMD NGM   "→N$[13]
35: "   CMD FF    "→N$[14]
36: "   CMD DIST  "→N$[15]
37: "   CMD BUF   "→N$[16]
38: "   ALT GW    "→N$[17]
39: "   ALT IAS   "→N$[18]
40: "   ALT TAT   "→N$[19]
41: "   ALT FUEL  "→N$[20]
42: "   ALT ALT   "→N$[21]
43: "   ALT WIND  "→N$[22]
44: "   PAGE      "→N$[23]
45: "  STATUS #1  "→N$[24]
46: "  STATUS #2  "→N$[25]
47: "  NO. OF ENG"→N$[26]
48: "  FLAP ANGLE"→N$[27]
49: "   AC SAT    "→N$[28]
50: "   AC TAS    "→N$[29]
51: "   AC MACH   "→N$[30]
52: "   AC ALT    "→N$[31]
53: "   AC FUEL   "→N$[32]
54: "TIME GAPSEC"→N$[33]
55: "NOISE CNT  "→N$[34]
56: ">3 PAR CNT "→N$[35]
57: "GEAR DOWN  "→N$[36]
58: "MODEL FLAG "→N$[37]
59: "ANTIICE&BLD"→N$[38]
60: "PLAN FLAGS "→N$[39]
61: "   SPARE    "→N$[40]
62: rcf 35,N$
63: end
*16076
```

```
20: "39sept26":
21: dim N$[40,11]
22: "    SAT      "→N$[1]
23: "    TAS      "→N$[2]
24: " FQ TNK 1    "→N$[3]
25: " FQ TNK2     "→N$[4]
26: "   MACH      "→N$[5]
27: "    ALT      "→N$[6]
28: " FQ TNK 3    "→N$[7]
29: "EPR FUTURE   "→N$[8]
30: "   TIME      "→N$[9]
31: "   BLEED     "→N$[10]
32: "   FLAP      "→N$[11]
33: "RAW FQ1      "→N$[12]
34: "RAW FQ2      "→N$[13]
35: "RAW RQ3      "→N$[14]
36: "RAW FQ REF   "→N$[15]
37: "RAW FQ VGND" →N$[16]
38: "RAW FQ VREF" →N$[17]
39: "RAW SAT      "→N$[18]
40: "RAW TAS      "→N$[19]
41: "RAW MACH     "→N$[20]
42: "RAW FINEALT" →N$[21]
43: "RAW C ALT    "→N$[22]
44: "RAW EPR      "→N$[23]
45: "SYN TEST 1   "→N$[24]
46: "SYNC TEST2   "→N$[25]
47: "DISCRETE 1   "→N$[26]
48: "DISCRETE 2   "→N$[27]
49: "TIME128ms    "→N$[28]
50: "  SPARE      "→N$[29]
51: "  SPARE      "→N$[30]
52: "  SPARE      "→N$[31]
53: "  SPARE      "→N$[32]
54: "  SPARE      "→N$[33]
55: "  SPARE      "→N$[34]
56: "  SPARE      "→N$[35]
57: "  SPARE      "→N$[36]
58: "  SPARE      "→N$[37]
59: "  SPARE      "→N$[38]
60: "  SPARE      "→N$[39]
61: "  SPARE      "→N$[40]
62: rcf 38,N$
63: end
*16307

20: "trk0,data enter 50,OCT20,1976":
21: dim X[50],Y[50],X$[100],T$[10],R$[10]
22: fmt 13x,1f3.0,11x,1f10.4,8x,1f10.4
23: fmt 1,"           CASE NO.              X
24: fmt 2,"ID#-HEADER#-FILE#-CURVE#-TITLE"
25: ent "LOAD DATA TAPE",R
26: "DATA":ent "NEW=1/EDIT=2/PLIST=3/LIST=4",S
27: if S=2;gto "LOAD"
28: if S=3 or S=4;gto "EDT"
```

```
29: ent "LEGEND",X$
30: "INPUT":ent "INPUT NUMBER OF DATA SETS",A
31: A→X[50];0→Y[50]
32: for J=1 to A
33: ent "X=?",X[J]
34: ent "Y=?",Y[J]
35: next J;jmp 3
36: "LOAD":ent "FILE NUMBER?",R
37: ldf R,X[*],Y[*],X$
38: ent "CORRECTION,hit CONTINUE if OK",D
39: prt X$
40: ent X$
41: "X1":prt "X parameters"
42: for J=1 to X[50]
43: prt X[J];ent X[J]
44: next J
45: prt "Y parameters"
46: for J=1 to X[50]
47: prt Y[J];ent Y[J]
48: next J
49: ent "CORRECTION,YES=1/NO=0",T
50: if T=1;gto "X1"
51: ent "FILE#?",B
52: rcf B,X[*],Y[*],X$
53: "AGAIN":ent "AGAIN:-YES=1/NO=0",T
54: if T=1;gto "DATA"
55: gto "END"
56: "EDT":ent "NO. OF FILES?",R
57: if S=3;wrt 2.2
58: for J=1 to R
59: ldf J,X[*],Y[*],X$
60: if S=3;gsb "LEG"
61: if S=4;gsb "LST"
62: next J
63: gto "AGAIN"
64: "LEG":
65: wrt 2,X$
66: ret
67: "LST":
68: wrt 2,X$
69: wrt 2.1
70: for I=1 to X[50]
71: wrt 2,I,X[I],Y[I]
72: next I
73: ret
74: "END":end
*30117

20: "POLY51,OCT20":dim X[50],Y[50],X$[100],Y$[10],T[50],T$[10]
21: dim A$[1,4],B$[1,4],C$[1,4]
22: flt 6
23: ldk 52
24: fmt 6,"ID#-HEADER#-FILE#-CURVE#-TITLE"
25: "STD"→Y$;0→Q→r49→r50
26: ent "TYPE    STD/SPC",Y$
27: ent "TAPE INPUT?-YES/NO",T$
28: if T$="NO";jmp 12
29: ent "INSERT DATA TAPE",R
30: ent "FILE NUMBER?",R
31: ldf R,X[*],Y[*],X$
32: wrt 2.6;wrt 2,X$;0→r49
33: rfa 13;wrt 2,"    DATA LISTING:";fxd Z
```

```
34: wrt 2,"                    CASE NO.
35: for I=1 to X[50]
36: X[I]→X;Y[I]→Y
37: 1→Z;gsb "D"
38: next I
39: jmp 2
40: wrt 2.6;ent "LEGEND",X$;wrt 2,X$
41: 0→Z→r0→r1→r2→r3→r4→r5→r6→r7→r8;1→I;cfg 1,13;sfg 6;1kd
42: wrt 2,"****************"
43: wrt 2,"*   QUADRATIC      REGRESSION   ** (Y=A+BX+CX↑2)**"
44: wrt 2,"****************"
45: ent "PLOT?",Z;if flg13=0;cfg 6
46: ent "DECIMAL PT.?",Z;if flg13+(Z<0)+(Z>11);cfg 13;gto +0
47: fxd Z;if flg6;gto +2
48: ent "POINT PLOT?",X;if flg13=0;gsb "P"
49: "CONT":
50: if T$="YES";jmp 7
51: cfg 13;wrt 2,"      DATA LISTING:";fxd Z
52: wrt 2,"              CASE NO.         X                        Y"
53: ent "  X=?",X;X→X[I];if flg13;if r0>3;gto "C"
54: ent "  Y=?",Y;Y→Y[I];if flg13;cfg 13;gto +0
55: 1→Z;gsb "D"
56: I+1→I;gto -3
57: 1→r49;for I=1 to X[50]
58: X[I]→X;Y[I]→Y
59: 1→Z;gsb "D"
60: next I
61: "C":ent "CORRECTIONS?",X;if flg13;cfg 13;gto "T"
62: wrt 2,"        DELETIONS:"
63: 0→r50;ent "CASE NO.",F;if flg13;cfg 13;gto "A"
64: X[F]→X;if flg13;cfg 13;gto "A"
65: Y[F]→Y;if flg13;cfg 13;gto +0
66: 1e6→X[F];1→r50
67: -1→Z;gsb "D"
68: gto -5
69: "A":wrt 2,"        ADDITIONS:"
70: 0→r50;ent "CASE NO.",F;if flg13;if r0>3;gto "T"
71: ent "ADD X=?",X;X→X[F];if flg13;if r0>3;gto "T"
72: ent "ADD Y=?",Y;Y→Y[F];if flg13;cfg 13;gto +0
73: 1→r50;1→Z;gsb "D"
74: if F>I;I+1→I
75: gto -5
76: "T":wrt 2,"****************"
77: r2r4-r3r3→r10;r2r3-r1r4→r11;r1r3-r2r2→r12
78: r0r4-r2r2→r13;r1r2-r0r3→r14;r0r2-r1r1→r15
79: r0r2r4+2r1r2r3-r0r3r3-r1r1r4-r2↑3→r9
80: (r10r6+r11r7+r12r8)/r9→A
81: (r11r6+r13r7+r14r8)/r9→B
82: (r12r6+r14r7+r15r8)/r9→C
83: r1/r0→r1;(r2-r0r1r1)/(r0-1)→r2;r6/r0→r6
84: (r5-r0r6r6)/(r0-1)→r5;Ar0r6+Br7+Cr8-r0r6r6→r16
85: (r0-1)r5-r16→r17;r16/2→r18;r17/(r0-3)→r19
86: wrt 2,"DATA STATISTICS:"
87: fmt 3,18x,"MEAN",14x,"VARIANCE",13x,"STD DEV"
88: wrt 2.3
89: fmt 4f20.6
90: wrt 2,"    X",r1,r2,√r2
91: fmt 4f20.6
92: wrt 2,"    Y",r6,r5,√r5
93: fmt 7,/
94: wrt 2.7
95: fts (A)→A$[1];stf(A$[1])→A
96: fts (B)→B$[1];stf(B$[1])→B
97: fts (C)→C$[1];stf(C$[1])→C
98: wrt 2,"REGRESSION RESULTS"
99: wrt 2,"                    COEF                     STD DEV"
```

```
100: fmt 9," A ",e23.9,"         ",e23.9
101: wrt 2.9,A,r(r10r19/r9)
102: fmt 9," B ",e23.9,"         ",e23.9
103: wrt 2.9,B,r(r13r19/r9)
104: fmt 9," C ",e23.9,"         ",e23.9
105: wrt 2.9,C,r(r15r19/r9)
106: fmt 7,/;wrt 2.7
107: wrt 2,"    RSQUARE",r16/(r0-1)r5;wrt 2.7;if fl96;9to "R"
108: ent "PLOT CURVE?",X;if fl913;cf9 13;9to "R"
109: if fl91;ent "NEW LIMITS?",X;cf9 1;if fl913;cf9 13;9to +2
110: if fl91=0;9sb "P"
111: 9sb "N"
112: "R":ent "ESTIMATE Y, X=?",X;if fl913;cf9 13;9to "O"
113: wrt 2,"VALUE OF X",X,"  COMPUTED Y",A+BX+CXX;spc ;9to -1
114: "O":if fl96;9to +4
115: ent "PLOT AOV?",X;if fl913;cf9 13;9to +3
116: 9sb "V"
117: 9to "2"
118: wrt 2,"AOV TABLE:"
119: fmt 2," SOURCE",13x,"    TOTAL",7x,"   REGRESSION",4x,"   RESIDUAL"
120: wrt 2.2
121: fmt 4f15.6
122: fmt 4f15.6
123: wrt 2," DEG. FREEDOM   ",r0-1,2,r0-3
124: wrt 2," SUM-OF-SQUARES",(r0-1)r5,r16,r17
125: wrt 2," MEAN SQUARE   ",r5,r18,r19
126: if r19=0;jmp 2
127: wrt 2," F-STATISTIC   ",r18/r19,"  D.F. NUM.",2,"  D.F. DEN.",r0-3
128: "2":wrt 2,"*****************"
129: fmt 1,3x,"CASE NO.",2x,"X OBS",7x,"Y OBS",7x,"Y EST",6x,"RESIDUAL",z
130: fmt 8,6x,"% FS"
131: wrt 2.1;wrt 2.8
132: abs(Y[I-1]-Y[1])→M
133: prt M
134: for J=1 to I-1
135: A+BX[J]+CX[J]↑2→K
136: Y[J]-K→L
137: if X[J]=1e6;0→X[J]→Y[J]→K→L→T[J];jmp 2
138: 100L/M→T[J]
139: fmt 3x,1f3.0,5f12.3
140: wrt 2,J,X[J],Y[J],K,L,T[J]
141: next J
142: ent "RESIDUAL PLOT?",X;if fl913=0;9sb "P1"
143: ent "ANOTHER RUN?",X;if fl913=0;9to 5
144: 0→X;ent "ENTER PROGRAM NUMBER",X;if fl913=0;if (X<1)+(X>20);9to +0
145: if X;ldp X
146: 9to "END"
147: "D":r0+Z→r0;r1+ZX→r1;r2+ZXX→r2;r3+ZX↑3→r3
148: r4+ZX↑4→r4;r5+ZYY→r5;r6+ZY→r6;r7+ZXY→r7;r8+ZXXY→r8
149: if fl91;if Z=1;ltr X,Y,111;lbl "+";9to +2
150: if fl91;if Z=-1;ltr X,Y,111;lbl "X"
151: I→P
152: if F=0;jmp 2
153: if r50=1;F→P
154: fmt 1f20.0,2f20.6
155: if r49=1;jmp 2
156: wrt 2,P,X,Y
157: ret
158: "N":r1→X;A+BX+CXX→Y;pen
159: plt X,Y;X+.01r23→X;A+BX+CXX→Y
160: if X<=r21;if Y<=r26;if r25<=Y;9to -1
161: pen;r1→X;A+BX+CXX→Y
162: plt X,Y;X-.01r23→X;A+BX+CXX→Y
163: if r20<=X;if Y<=r26;if r25<=Y;9to -1
164: if Y$="SPC";jmp 4
165: ltr r20-.4r23,r25-.15r28,221;lbl "Y=  ";lbl A
```

```
166: ltr r20-.3r23,r25-.25r28,221;lbl B;lbl "X"
167: ltr r20-.3r23,r25-.35r28,221;lbl C;lbl " X↑2"
168: ltr r20,r25;ret
169: "P":ent "PLOTTER READY?",X;cfg 13
170: ent "X-MIN=?",r20,"X-MAX=?",r21,"X-TIC WIDTH=?",r24
171: r21-r20→r23
172: prt "X-MIN",r20,"X-MAX",r21;spc
173: ent "Y-MIN=?",r25,"Y-MAX=?",r26,"Y-TIC WIDTH=?",r29
174: r26-r25→r28
175: prt "Y-MIN",r25,"Y-MAX",r26;spc 2
176: ent "X-AXIS DEC PT?",D;if flg13+(D<0)+(D>11);cfg 13;gto +0
177: ent "Y-AXIS DEC PT?",E;if flg13+(E<0)+(E>11);cfg 13;gto +0
178: if Y$="SPC" and Q=0;scl r20,r21,r25,r26;jmp 3
179: scl r20-.4r23,r21+.1r23,r25-.4r28,r26+.1r28
180: if Q=1;axe r20,0,r24,r29;jmp 2
181: axe r20,r25,r24,r29
182: r24→X;fxd D
183: if Y$="SPC" and Q=0;jmp 7
184: ltr r20+.1,r26,221;lbl X$
185: ltr r20+X,r25-.25r28,222;lbl r20+X;X+r24→X;if X+r20<=r21;gto +0
186: ltr r20+r24,r25-.4r28,331;ent "LABEL X-AXIS",X;if flg13=0;gto +0
187: cfg 13;r29→Y;fxd E
188: ltr r20-.25r23,r25+Y,221;lbl r25+Y;Y+r29→Y;if Y+r25<=r26;gto +0
189: ltr r20-.35r23,r25+r29,332;ent "LABEL Y-AXIS",Y;if flg13=0;gto +0
190: cfg 13;ltr r20,r25;sfg 1;ret
191: "V":cfg 13;ent "PLOTTER READY?",X;cfg 13
192: scl 0,100,0,100
193: ltr 33.08,74.3,641;lbl "AOV TABLE"
194: ltr 15.24,63,421;lbl "SOURCE OF";ltr 15.24,59.1;lbl "VARIATION"
195: ltr 37.16,63;lbl "SUM OF";ltr 37.16,59.1;lbl "SQUARES"
196: ltr 55.32,63;lbl "DEG OF";ltr 55.32,59.1;lbl "FREEDOM"
197: ltr 75.36,63;lbl "MEAN";ltr 73.48,59.1;lbl "SQUARE"
198: ltr 21.3,52.8,211;lbl "TOTAL"
199: ltr 40.45,52.8;lbl r16+r17;ltr 58,52.8;lbl r0-1;ltr 76.3,52.8;lbl r5
200: ltr 18.44,46.5;lbl "REGRESSION"
201: ltr 40.45,46.5;lbl r16;ltr 58,46.5;lbl 2;ltr 76.3,46.5;lbl r18
202: ltr 19.38,40.2;lbl "RESIDUAL"
203: ltr 40.45,40.2;lbl r17;ltr 58,40.2;lbl r0-3;ltr 76.3,40.2;lbl r19
204: ltr 27.6,28,421;lbl "F STATISTIC";lbl r18/r19
205: ltr 35,23,211;lbl "D.F. NUM.= ";lbl 2
206: ltr 35,20;lbl "D.F.DEN=";lbl r0-3
207: ltr 0,0;ret
208: "P1":1→Q;gsb "P"
209: for J=1 to I-1
210: if J=1;pen;plt X[J],T[J];jmp 2
211: plt X[J],T[J]
212: next J
213: ret
214: "END":end
*24875
```

```
20: "PF61":eir 2,32;if R=F[32];jmp 4
21: cll 'Z'(11,15)
22: for J=0 to 4;D[22]→D[33+J];next J
23: D[19]→D[13];D[20]→D[12];D[24]→D[31];D[25]→D[32]
24: D[15]-.00642D[15]+.3754→r12;if E[17]=0;2→Y;0→Z;trk 0;ldf 8,V,V
25: 3→E[17];gto "EZ"
26: "Z":R→F[32];cll 'V14'(10,F)
27: cll 'V14'(9,F);1→M[32];gsb "XCU"
28: eir 2;if M[32]=1;jmp 0
29: eir 2,0;A→r2
```

```
30: for H=0 to p1-1
31: A+p2→W;1→M[32];gsb "XCU"
32: eir 2;if M[32]=1;jmp 0
33: eir 2,0;if W=19;.6D[19]→D[20];D[22]→r1
34: if W=15;D[15]+.7-D[10]→A[25]
35: if W=17;D[17]/1000→D[43]→D[44]
36: if W#22;jmp 4
37: if M[27]=0;jmp 2
38: if r1=D[22];jmp 2
39: cll 'EN'(D[22],0,0,0,0,0,0,D[23])
40: next A;r2→A
41: cll 'V12'(10,F);cll 'V12'(9,F)
42: if R=1;1→M[27];56→W;0→M[31];trk 1;rcf 60,D[*],F[*],M[*];trk 0;jmp 3
43: if bit(13,F)=1;29→W;jmp 2
44: M[33]→W
45: gsb "XCU"
46: eir 2;ret
*20557

20: "TO62SEP29":R→F[32];eir 2,32
21: if D[71]<.2;0→E[17]
22: if E[17]#0;jmp 7
23: cll 'EL1'(2,D[31],D[11],Y,D[64],D[63]);1→E[17]
24: if F[29]#2;D[64]→D[62];D[63]→D[61];jmp 5
25: cll 'EL1'(2,D[32],D[11],Y,D[62],D[61])
26: if D[64]-D[62]>.1a;D[64]-.1a→D[62]
27: if D[63]-D[61]>.1a;D[63]-.1a→D[61]
28: 1→E[17]
29: 'D2'(90,D[7])→D[66]
30: gto "EZ"
31: "EL1":for I=0 to 1
32: 1→r20;3→r21;-40→r28
33: if p3<=0 or p2>85;2→r20;4→r21
34: if p3<5.56 or p2>r28;jmp 4
35: if bit(I,p4)=0;jmp 2
36: 2.3→r26;jmp 5
37: 2.35→r26;jmp 4
38: 'D2'(r20,p3)→r25;if p2>60 and p2<85;2→r26;jmp 3
39: if p2>r25;'D2'(r21,p2)→r26;jmp 2
40: 'D2'(r21,r25)→r26
41: if bit(I,p4)=0;'D2'(5,r26)→r26
42: if I=0;'D2'(6,r26)→r26
43: if bit(2,p4)=0 and bit(3,p4)=0 and bit(4,p4)=0 and bit(5,p4)=0;jmp 2
44: if I=0;r26-.03→r26
45: if I=0;r26→p5;jmp 2
46: r26→p6
47: next I
48: ret
*26963

20: "CLB63":0→r19→r35
21: if F[29]=1 and A[6]#0 and R=F[32];A[6]→r18;'IS'(r18,E[1])→D[66];jmp 9
22: if F[29]#1 or D[11]<7 or F[30]#3;jmp 3
23: trk 0;ldf 10,V,V
24: E[9]→D[66];jmp 2
25: A[11]→D[66]
26: if D[11]<7;250→D[66];jmp 8
```

```
27: 'MA'(D[66],E[1])→r18;if F[29]=1;jmp 3
28: if r18<A[12];jmp 2
29: A[12]→r18→r19;'IS'(r18,E[1])→D[66]
30: "CA":'D2'(93,D[7]/10E[1])→r16;'IS'(r16,E[1])→r16
31: if D[66]<r16;r16→D[66];1→r35;jmp 3
32: 'ASX'(D[11],Z)→r16
33: if D[66]>r16;r16→D[66]
34: 'MA'(D[66],E[1])→r18
35: if r18<=.895;jmp 2
36: .895→r18;'IS'(r18,E[1])→D[66]
37: 'ATT'(r18,E[3])→E[6]
38: cll 'GS'(D[12],E[3],r18,D[2],E[14])
39: cll 'EL'(3,E[6],D[11],Y,D[64],D[63])
40: D[64]→D[62];D[63]→D[61]
41: cll 'DR'(D[7],E[1],r18,r12,r13)
42: 'TH'(D[61],D[62],r18,D[11],E[1])→r14
43: if r19=0;D[66]→r19
44: 'AT'(3,D[11],r19,D[7],r14,r13,r12,0)→D[65]
45: 'FF'(D[11],r14,r18,E[1],E[2],E[6])→r32
46: 'CZ'(D[2],r32)→D[3];r32/F[30]→D[4]
47: ((F[43]+F[45])D[61]+F[44]D[62])/F[30]→r12
48: if r12>D[63] or r12>D[64];jmp 2
49: r12→D[61]→D[62]
50: r18→D[1];if F[30]=3;jmp 8
51: 0→D[28]→D[29]
52: 'AC'(r18,D[11],E[1])→r34
53: 'CR'(r34,r18,E[2],r14,r13,D[7])→r33
54: if r33>.3 or r35=1;jmp 2
55: D[66]-10→D[66];gto "CA"
56: if E[17]=0;trk 0;ldf 7,V,V
57: jmp 6
58: trk 0;ldf 14,V,V
59: cll 'EL'(3,D[9],D[11],Y,D[64],D[63]);if D[62]>D[64];D[64]→D[62]
60: if D[61]>D[63];D[63]→D[61]
61: if F[29]=1 and A[6]#0;1000A[6]→D[66]
62: if F[29]=2 and D[11]>=23.4;1000A[12]→D[66]
63: E[17]+1→E[17]
64: gto "EZ"
*12958

20: 0→r35;if R=F[32];jmp 2
21: R→F[32];340→A[15];.8→A[16];.82→A[8]
22: if D[11]<=10;250→D[66];1→r13;gto "C9"
23: if F[29]=2;jmp 3
24: 10000→r12;0→r13→r14→r15
25: .86→r18;'IS'(r18,E[1])→D[66];gto "C9"
26: A[15]→D[66];'MA'(D[66],E[1])→r18;if r18<=A[16];jmp 2
27: A[16]→r18;'IS'(r18,E[1])→D[66]
28: "C9":'D2'(93,.1D[7]/E[1])→r16;'IS'(r16,E[1])→r16
29: if D[66]<r16;r16→D[66];1→r13→r35;jmp 2
30: 'ASX'(D[11],Z)→r16;if D[66]>r16;r16→D[66]
31: 'MA'(D[66],E[1])→r18;if r18<=.895;jmp 2
32: .895→r18;'IS'(r18,E[1])→D[66]
33: 'ATT'(r18,E[3])→E[6]
34: cll 'GS'(D[13],E[3],r18,D[2],E[14])
35: cll 'DR'(D[7],E[1],r18,r16,r17)
36: cll 'EL'(4,E[6],D[11],Y,D[64],D[63])
37: cll 'ER'(r18,D[11],r17,E[1],D[62],D[61])
38: if r35=1;D[64]→D[62];D[63]→D[61];jmp 2
39: if D[62]>D[64] or D[61]>D[63];D[66]-10→D[66];r15+1→r15;gto "C9"
40: 'FF'(D[11],r17,r18,E[1],E[2],E[6])→r32
41: 'CZ'(D[2],r32)→r31;if F[29]=1 and r13=0 and F[30]=3;jmp 11
```

```
42: 'AT'(4,D[11],r18,D[7],r17,r17,r16,0)→D[65];r31→D[3]
43: 'BU'(D[7],r18,E[1])→r34;D[3](D[10]-D[16])→r33
44: r32/F[30]→D[4];((F[43]+F[45])D[61]+F[44]D[62])/F[30]→r12
45: if r12<D[63] and r12<D[64];r12→D[61]→D[62]
46: r18→D[1]→D[37+F[29]];trk 0;ldf 15,V,V
47: cll 'EL'(4,D[9],D[11],Y,D[64],D[63]);if D[62]>D[64];D[64]→D[62]
48: r33→D[5];r34→D[6];if D[61]>D[63];D[63]→D[61]
49: if E[17]=1;trk 0;ldf 8,V,V
50: E[17]+1→E[17];if E[17]>A[17];0→E[17]
51: gto "EZ"
52: 60A[19]/D[2]+A[18]/r31→r19;if r19<r12;jmp 3
53: if r14=0 or r15=1;r18+.1→r18;1→r14;2→r15;10000→r12;jmp 3
54: .01int((r18+.015)100)→r18;A[8];1→r13;jmp 2
55: r18-.05→r18;r19→r12;if r14=1;r18+.04→r18
56: 'IS'(r18,E[1])→D[66];gto "C9"
*17485

20: "TAP65":R→F[32]
21: if D[11]<=10;250→D[66];gto "C9"
22: A[21]→r12;'MA'(r12,E[1])→r13
23: A[20]→r14;'IS'(r14,E[1])→r15
24: if r13<=r14;r13→D[1];r12→D[66];jmp 2
25: r14→D[1];r15→D[66]
26: "C9":'D2'(93,D[7]/10E[1])→r16;'IS'(r16,E[1])→r16
27: if D[66]<r16;r16→D[66];1→r35;jmp 3
28: 'ASX'(D[11],2)→r16
29: if D[66]>r16;r16→D[66]
30: 'MA'(D[66],E[1])→D[1]
31: if D[1]<=.895;jmp 2
32: .895→D[1];'IS'(D[1],E[1])→D[66]
33: 'ATT'(D[1],E[3])→E[6]
34: cll 'GS'(D[13],E[3],D[1],D[2],E[14])
35: cll 'DR'(D[7],E[1],D[1],r16,r17)
36: cll 'EL'(5,E[6],D[11],Y,D[64],D[63])
37: cll 'ER'(D[1],D[11],r17,E[1],D[62],D[61])
38: if r35=1;D[64]→D[62];D[63]→D[61];jmp 2
39: if D[62]>D[64] or D[61]>D[63];D[66]-10→D[66];gto "C9"
40: r17→r32
41: 'FF'(D[11],r32,D[1],E[1],E[2],E[6])→D[4]
42: 'CZ'(D[2],D[4])→D[3]
43: 'AT'(4,D[11],D[1],D[7],r17,r17,r16,0)→D[65]
44: 'BU'(D[7],D[1],E[1])→D[6]
45: 'DI'→D[5]
46: D[4]/F[30]→D[4];D[1]→D[42]
47: ((F[43]+F[45])D[61]+F[44]D[62])/F[30]→r12
48: if r12>D[63] or r12>D[64];jmp 2
49: r12→D[61]→D[62]
50: trk 0;ldf 15,V,V
51: cll 'EL'(5,D[9],D[11],Y,D[64],D[63]);D[1]→D[42]
52: if D[62]>D[64];D[64]→D[62]
53: if D[61]>D[63];D[63]→D[61]
54: if E[17]=1;trk 0;ldf 8,V,V
55: E[17]+1→E[17]
56: if E[17]>A[17];0→E[17]
57: gto "EZ"
58: "DI":
59: 'CZ'(D[2],D[4])→J[1]
60: D[15]+D[16]→J[2]
61: cll 'DR'(J[2],E[1],D[1],J[3],J[4])
62: cll 'ER'(D[1],D[11],J[4],E[1],J[5],J[6])
63: 'TH'(J[6],J[5],D[1],D[11],E[1])→r33
64: 'FF'(D[11],r33,D[1],E[1],E[2],E[6])→J[7]
```

```
65: 'CZ'(D[2],J[7])→J[8]
66: ((J[8]+J[1])/2)(D[10]-D[16])→p1
67: ret p1
*15296
```

```
20: "DST66":0→D[2]→D[3]→D[5]→D[6]→A[8];if R=F[32];jmp 2
21: R→F[32];.6D[13]→D[14];0→E[17]
22: if D[11]<=10;250→D[66]→r19;'MA'(D[66],E[1])→D[1];jmp 5
23: 'MA'(A[22],E[1])→D[1]
24: A[22]→D[66]→r19
25: if D[1]<A[23];jmp 2
26: A[23]→D[1]→r19;'IS'(D[1],E[1])→D[66];D[1]→A[8]
27: 'D2'(93,D[7]/10E[1])→r16;'IS'(r16,E[1])→r16
28: if D[66]<r16;r16→D[66]→r19;jmp 3
29: 'ASX'(D[11],Z)→r16
30: if D[66]>r16;r16→D[66]→r19
31: 'MA'(D[66],E[1])→D[1]
32: if D[1]<=.895;jmp 2
33: .895→D[1]→r19;'IS'(D[1],E[1])→D[66]
34: cll 'DR'(D[7],E[1],D[1],r12,r13)
35: 'AC'(r19,D[11],E[1])→r14;-r14→r14
36: cll 'GS'(D[14],E[3],D[1],r15,r16)
37: if D[11]<32;'IT'(D[1],D[11])→r17;jmp 3
38: 'DL'(D[11])→r18
39: 'DT'(r13,r18,D[7],r14,r16)→r17
40: cll 'ER'(D[1],D[11],r14,E[1],D[62],D[61])
41: cll 'EL'(6,D[9],D[11],Y,D[64],D[63])
42: 'AT'(6,D[11],r19,D[7],r17,r13,r12,0)→D[65]
43: ((F[43]+F[45])D[61]+F[44]D[62])/F[30]→r12
44: if r12>D[63] or r12>D[64];jmp 2
45: r12→D[61]→D[62]
46: if D[61]<1;1→D[61]
47: if D[62]<1;1→D[62]
48: trk 0;ldf 16,V,V
49: if A[8]#0;1000A[8]→D[66]
50: if E[17]=1;trk 0;ldf 8,V,V
51: E[17]+1→E[17]
52: if E[17]>A[17];0→E[17]
53: gto "EZ"
54: "DL":'D2'(98,p1)→p2
55: ret p2
*10937
```

```
20: "67":0→D[2]→D[3]→D[5];R→F[32]
21: if F[29]=1;0→r31;jmp 2
22: A[14]→r31
23: 1/cos(r31)→r13;D[7]r13→r14
24: r14/E[1]→r32;'D2'(93,r32/10)→D[1]
25: 'IS'(D[1],E[1])→D[66];'ASM'(D[7],Z)→r16
26: if D[66]<r16;r16→D[66];jmp 3
27: 'ASX'(D[11],Z)→r16
28: if D[66]>r16;r16→D[66]
29: 'MA'(D[66],E[1])→D[1];if D[1]<=.895;jmp 2
30: .895→D[1];'IS'(D[1],E[1])→D[66]
31: 'ATT'(D[1],E[3])→E[6]
32: cll 'DR'(r14,E[1],D[1],r15,r16)
33: cll 'ER'(D[1],D[11],r16,E[1],D[62],D[61])
```

```
34: ret p4
35: "BU":'D2'(94,p2)→r21;if p2>.7;'D2'(95,p2)→r21
36: r21/(p1/p3)→p4;ret p4
37: "CZ":p1/p2→p3;ret p3
38: "D2":p1→r1;0→J→K;p2→r4;gsb "D2A"
39: Y[1]→p3;ret p3
40: "D2A":stf(A$[r1+J])+stf(B$[r1+J])r4+stf(C$[r1+J])r4↑2→Y[J+1+2K]
41: cir 2;ret
42: "D2B":for J=0 to 1;gsb "D2A"
43: next J;ret
44: "D3":p1→r1;p4→r3;0→A;gsb "D3A"
45: p1+J→r1;0→K;p3→r4;gsb "D2B"
46: gsb "INT"
47: Y[5]→p5;ret p5
48: "D3A":H[p2+1+A]→r5;H[p2+2+A]→r6;H[p2+A]→r7;r3-r5→r8;0→J
49: if r8<=r6;jmp 3
50: J+1→J;r8-r6→r8
51: if J<r7-2;jmp -2
52: ret
53: "D4":p1→r1;p3→r4;p5→r3;3→A;gsb "D3A"
54: r8→r11;r6→r10;J→r9;p4→r3;0→A;gsb "D3A"
55: p1+J+r9r7→r1
56: for K=0 to 1
57: r1+Kr7→r1;gsb "D2B"
58: gsb "INT"
59: next K
60: r11→r8;r10→r6;gsb "INT"
61: Y[5+K]→p6;ret p6
62: "INT":(Y[2+2K]-Y[1+2K])r8/r6+Y[1+2K]→Y[5+K];ret
63: "DR":p1/p2/1.4815A[1]p3↑2→p4;if Z=0;jmp 3
64: 0→r21;'D3'(101,7,p4,Z)→r20;if F[31]=1;'D3'(108,7,p4,Z)→r21
65: r20+r21→r20;jmp 4
66: if p3<=.7;'D2'(115,p4)→r20;jmp 3
67: if p3<=.76;'D3'(115,16,p4,p3)→r20;jmp 2
68: 'D3'(116,19,p4,p3)→r20
69: 1.4814A[1]r20p3↑2p2→p5;if F[30]=3;ret
70: 'D2'(99,p3),.001→r21;p5+r21p2(3-F[30])→p5;if F[30]=1 and F[44]=1;jmp 5
71: if F[30]=2 and F[43]=1 and F[45]=1;jmp 4
72: if p2>.22336;145.44203(1-p2↑.1902512)→r27;15-1.9812r27→r26;jmp 2
73: D[21]-20.806ln(p2/.22336)→r27;-56.5+E[4]→r26
74: 'ATT'(p3,r26)→r28
75: cll 'EL'(R,r28,r27,Y,r29,r30);'TH'(r29,r30,p3,r27,p2)→r23
76: if F[30]=1;r23→r22;jmp 2
77: r23/2→r22
78: (r22/p2+r21).21/1.481p3↑2→r24;'D2'(100,r24)→r25;p5+1.481r25p2p3↑2→p5;ret
79: "EN":if p1>D[21];.2243/2.718↑((p1-D[21])/20.806)→p4;jmp 2
80: (1-.00688p1)↑5.256153→p4
81: (p3+273.16)/(.2p2↑2+1)-273.16→p6;(p6+273.16)/288→p5
82: 15-1.9812p1→p8;if p1>D[21];-56.5→p8
83: p6-p8→p7;if R=1;D[23]-15+1.9812D[22]→p7
84: ret
85: "EL":for I=0 to 1;8bit(I,p4)→r20→r21;if F[30]#3 or p1=3;jmp 5
86: if p1#8;gto "EA"
87: if p2>32;14+r21→r21;10+r20→r20;gto "EB"
88: if p2>19;2.008-.038bit(I,p4)→r26;gto "E3"
89: jmp 3
90: 9+r20→r20;12+r21→r21;-53→r28;if p2>5;r21+1→r21
91: if F[30]=3 or p3<1.5 or p3>20;gto "E2"
92: 8+8bit(I,p4)→r20;3+r20→r21;-37→r28;gto "E2"
93: "EA":if p3>=35;jmp 3
94: 79+2bit(I,p4)→r29;if p2>5;r29+1→r29
95: if p3<=30;r29→r21;jmp 4
96: 12+8bit(I,p4)→r30;if p3>=35;r30→r21;jmp 3
97: 'D2'(r30,p2)→r30;r29→r21;'D2'(r29,p2)→r29
98: r29+.2(p3-30)(r30-r29)→r26;jmp 2
99: 'D2'(r21,p2)→r26
100: gto "E3"
```

```
101: "E2":if p3<5.66 or p2>r28;jmp 4
102: if bit(I,p4)=1;2.335→r26;jmp 2
103: 2.28→r26
104: jmp 3
105: "EB":'D2'(r20,p3)→r25;if p2>r25;'D2'(r21,p2)→r26;jmp 2
106: 'D2'(r21,r25)→r26
107: "E3":if I=0;'D2'(15+8bit(I,p4),r26)→r26;jmp 2
108: if bit(I,p4)=1 and p3>25;'D3'(24,28,r26,p3)→r26
109: if band(60,p4)=0;gto "E5"
110: 0→r27;if I=1;jmp 7
111: if bit(3,p4)=0;jmp 5
112: if r21=11 or r21=19 or r21>78;.09→r27
113: if r21<14 or r21=20 or r21=21;.095→r27
114: if r21=14 or r21=22;.03→r27
115: gsb "E4"
116: jmp 13
117: if bit(2,p4)=0;jmp 4
118: if r21=11 or r21=19;.055→r27
119: if r21<14 or r21=20 or r21=21 or r21>78;.06→r27
120: gsb "E4"
121: if bit(4,p4)=0;jmp 4
122: if r21<22;.085→r27
123: if r21>78;.08→r27
124: gsb "E4"
125: if bit(5,p4)=0;jmp 4
126: if r21<22;.09→r27
127: if r21>78;.085→r27
128: gsb "E4"
129: "E5":r26→p6;if I=0;r26→p5
130: next I;ret
131: "E4":r26-r27→r26;0→r27;ret
132: "ER":p3/p4/F[30]→p7;if p2<=25;0→r20;jmp 2
133: .0071(p2-25)(p1-.3)→r20
134: 'D3'(38,1,p7+r20,p1)→p6;'D3'(60,1,p7+r20,p1)→p5;ret
135: "FF":p2/F[30]→r22;r22/p4→r23
136: for I=0 to 1;'D4'(144-15I,22,r23,p3,p1)→r21;r21rp5r22→E[19+I];next I
137: ((F[43]+F[45])E[20]+F[44]E[19])→p8;ret p8
138: "GS":r(p2+273.16)38.966955p3→p5;p5+p1→p4;ret
139: "IS":661.47482r((((p1↑2/5+1)↑3.5-1)p2+1)↑.2857-1)5)→p3;ret p3
140: "MA":r(5((1/p2*((.2(p1↑2/437548.94)+1)↑3.5-1)+1)↑.2857-1))→p3;ret p3
141: "ASM":'D2'(91,p1)→r21;70→r22;if p2=30;5→r22
142: if p2=15;20→r22
143: if p2=5;30→r22
144: if p2=2;50→r22
145: r21+r22→p3;ret p3
146: "ASX":if p2#0;jmp 3
147: 'D2'(97,p1)→p3;p3-10→p3;if p1>21.5;'D2'(96,p1)→p3
148: jmp 4
149: 185→p3;if p2=2;230→p3
150: if p2=5;215→p3
151: if p2=15;205→p3
152: ret p3
153: "AT":if p1=4 or p1=5 or p1=7;0→r25;jmp 4
154: p5-p6→r30;cll 'EN'(D[21],0,0,r26)
155: 'AC'(p3,p2,r26)→r23;if p1=6 or p1=8;-r23→r23
156: 1/(1+r23)→r23;57.296r30r23/p4→r25
157: 'D3'(83,7,p7,p8)→r24;r24-2+r25→p9;ret p9
158: "CR":.6615p2rp3→r20;101.28((p4-p5)/p6)r20/(1+p1)→p7;ret p7
159: "DS":.101268p2(p4-p3)/p5(1+p1)→p7;ret p7
160: "ATT":(.2p1↑2+1)(p2+273.16)-273.16→p3;ret p3
161: "TH":for I=0 to 1;p1→r20;if I=0;p2→r20
162: 'D3'(49-22I,1,r20,p3)→r22
163: 0→r23;if p4>25;.0071(p4-25)(p3-.3)→r23
164: r22+r23→E[19+I];next I
165: ((F[43]+F[45])E[20]+F[44]E[19])p5→p6;ret p6
166: "DT":p1-p2p3(1+p4)/.10128p5→p6;ret p6
```

```
157: "IT":'D3'(76,31,p1,p2)→p3;if p1<.6;'D3'(71,4,p1,p2)→p3
168: ret p3
169: trk 0;ldf 11,V,V+29
*12362
```

```
20: "ENGOUT":if F[30]=2;36→J[1];jmp 2
21: 25→J[1]
22: "XX":cll 'EN'(J[1],0,0,J[2])
23: 'D2'(93,D[7]/10J[2])→J[3]
24: cll 'DR'(D[7],J[2],J[3],J[4],J[5])
25: cll 'ER'(J[3],J[1],J[5],J[2],J[6],J[7])
26: if J[1]>=D[21];-56.5+E[4]→J[8];jmp 2
27: 15-1.9812J[1]+E[4]→J[8]
28: 'ATT'(J[3],J[8])→J[9]
29: cll 'EL'(4,J[9],J[1],Y,J[10],J[11])
30: if J[1]<=0;0→J[1]→J[13];jmp 8
31: if J[1]>D[11];J[10]-.01→J[10];J[11]-.01→J[11]
32: if J[6]>J[10] or J[7]>J[11];J[1]-1→J[1];gto "XX"
33: D[7]/600→J[12]
34: if J[12]>.22336;jmp 2
35: D[21]-20.806ln(J[12]/.22336)→J[13]
36: 145.44203(1-J[12]↑.1902512)→J[13]
37: if J[13]>J[1];J[1]→J[13]
38: J[1]→D[68];J[13]→D[67]
39: 2→E[17];gto "EZ"
*29007
```

```
20: "M08":if F[30]#3;trk 0;ldf 7,V,V
21: 0→D[67];if R=1;r12→J[3];jmp 2
22: D[7]→J[3];0→J[20]
23: D[11]→J[1];if D[11]>=30;30→J[1]
24: "MX":cll 'EN'(J[1],0,0,J[6])
25: 'D2'(92,J[3]/10J[6])→J[30]→J[24]
26: if R=4 and F[29]=2 and D[1]>J[30];D[1]→J[24]
27: if J[1]<=10;250→J[15]→J[31];'MA'(J[15],J[6])→J[2];jmp 4
28: A[11]→J[15]→J[31];'MA'(J[15],J[6])→J[2]
29: if J[2]<A[12];jmp 2
30: A[12]→J[2]→J[31];'IS'(J[2],J[6])→J[15]
31: 'D2'(93,J[3]/10J[6])→J[30];'IS'(J[30],J[6])→J[30]
32: if J[15]<J[30];J[30]→J[15]→J[31];jmp 2
33: 'ASX'(J[1],0)→J[30];if J[15]>J[30];J[30]→J[15]→J[31]
34: 'MA'(J[15],J[6])→J[2]
35: if J[2]<=.895;jmp 2
36: .895→J[2]→J[31];'IS'(J[1],J[6])→J[15]
37: if J[1]>=D[21];-56.5+E[4]→J[30];jmp 2
38: 15-1.9812J[1]+E[4]→J[30]
39: 'ATT'(J[2],J[30])→J[5]
40: cll 'EN'(J[1],J[2],J[5],J[6],J[7],J[8],J[9],J[10])
41: cll 'EL'(3,J[5],J[1],Y,J[11],J[12])
42: cll 'DR'(J[3],J[6],J[24],J[16],J[17])
43: cll 'ER'(J[24],J[1],J[17],J[6],J[28],J[29])
44: 'ATT'(J[24],J[30])→J[32];cll 'EL'(4,J[32],J[1],Y,J[26],J[27])
45: if J[28]>J[26]-.05 or J[29]>J[27]-.05;gto "M7"
46: 'TH'(J[12],J[11],J[2],J[1],J[6])→J[14]
47: 'FF'(J[1],J[14],J[2],J[6],J[7],J[5])→J[13]
48: cll 'DR'(J[3],J[6],J[2],J[16],J[17])
49: 'AT'(3,J[1],J[31],J[3],J[14],J[17],J[16],0)→J[18]
```

```
50: 'AC'(J[31],J[1],J[6])→J[19]
51: 'CR'(J[19],J[2],J[7],J[14],J[17],J[3])→J[20]
52: 'D2'(95,J[24])→J[21];if J[24]<.7;'D2'(94,J[24])→J[21]
53: J[21]/A[24]→J[21];J[3]/J[21]→J[22]→J[35];J[3]/600→J[36]
54: for D=0 to 1;if J[35+D]>.22336;jmp 2
55: D[21]-20.806ln(J[35+D]/.22336)→J[37+D];jmp 2
56: 145.44203(1-J[35+D]↑.1902512)→J[37+D]
57: next D
58: if J[3]/J[6]>600 and D[67]=0;J[38]→D[67]
59: if J[1]>J[37];J[37]→D[68];jmp 3
60: if J[20]>.4;J[1]+J[20]→J[1];J[3]-J[13]/60→J[3];gto "MX"
61: "M7":J[1]-J[20]/2→D[68]
62: if D[67]<=0 or D[67]>D[68];D[68]→D[67]
63: 2→E[17];gto "EZ"
*819
```

```
20: "CLZ9":cll 'EN'(D[33],0,0,J[10])
21: if D[33]<=10;250→J[21];'MA'(J[21],J[10])→J[2];1→J[31];jmp 2
22: 10000→J[30];0→J[31]→J[32]→J[33];.84→J[2];'IS'(J[2],J[10])→J[21]
23: cll 'CZF'(D[7]-E[12],D[33],D[13],J[21],J[20],J[14])
24: J[20]→A[4];J[14]→A[5];J[2]→E[11]
25: trk 0;ldf 10,V,V+3
26: "CZF":p1→J[1];p2→J[3];p3→J[5];p4→J[21]
27: if J[3]>D[21];-56.5+E[4]→J[8];jmp 2
28: 15-1.9812J[3]+E[4]→J[8]
29: "C9":'ATT'(J[2],J[8])→J[9]
30: cll 'EN'(J[3],J[2],J[9],J[10],J[11],J[8],J[4],J[12])
31: cll 'GS'(J[5],J[8],J[2],J[13],J[14])
32: cll 'DR'(J[1],J[10],J[2],J[15],J[16])
33: cll 'EL'(4,J[9],J[3],Y,J[22],J[23])
34: cll 'ER'(J[2],J[3],J[16],J[10],J[17],J[18])
35: 'TH'(J[18],J[17],J[2],J[3],J[10])→J[6]
36: 'FF'(J[3],J[6],J[2],J[10],J[11],J[9])→J[20]
37: 'CZ'(J[13],J[20])→J[40]
38: if J[31]=0;gto "K"
39: J[20]→p5;J[14]→p6;ret
40: "K":60A[19]/J[13]+A[18]/J[40]→J[34]
41: if J[34]<J[30] and J[32]=0;J[2]-.05→J[2];J[34]→J[30];jmp 4
42: if J[30]=0;J[2]+.1→J[2];1→J[32];10000→J[30];jmp 3
43: if J[34]<J[30] and J[32]=1;J[2]-.01→J[2];J[34]→J[30];jmp 2
44: J[2]+.01→J[2];int((J[2]+.005)100)/100→J[2];1→J[31]
45: 'IS'(J[2],J[10])→J[21];gto "C9"
*9391
```

```
20: "CE10":370→E[9]
21: 0→A[7];100000→E[15];10→r13;if R=F[32];jmp 2
22: R=F[32];370→E[9];'MA'(E[9],E[1])→A[8];1000→A[3];0→A[6]
23: if D[11]>D[33];A[8]→A[6];'IS'(A[6],E[1])→E[9];jmp 19
24: 5→E[16];if D[33]-D[11]<E[16];D[33]-D[11]→E[16]
25: if E[11]=0;cll 'CLF'(D[11],5,D[33],320,E[12]);trk 0;ldf 9,V,V
26: A[5]+D[19]→E[8];E[8]/A[4]→E[7]
27: "C1":E[9]-r13→E[9]
28: 'MA'(E[9],E[1])→J[39];if J[39]>.82;jmp -1
29: cll 'CLF'(D[11]+E[16]/2,E[16],D[11]+E[16],E[9],r14,r15,r31)
30: if A[7]=0;r15→r16;1→A[7]
31: r16-r15→r17
32: r17/E[7]→r18;60r17/E[8]→r32;(r14+r18)A[18]+(r31+r32)A[19]→r19
```

```
33: if r13=2.5;jmp 2
34: if r19-E[15]>-.3 and r19-E[15]<0;2.5→r13;E[9]+7.5→E[9];jmp -5
35: if r19<E[15]-.02;r19→E[15];gto "C1"
36: E[9]+r13→E[9];'MA'(E[9],E[1])→J[13]
37: jmp 1
38: if A[8]>=.78 and abs(J[13]-A[8])<.005;J[13]→A[6];'IS'(A[6],E[1])→E[9]
39: J[13]→A[8]
40: int((E[9]+2.5)/5)*5→E[9];if E[9]-A[3]>0 and E[9]-A[3]<=10;A[3]→E[9]
41: E[9]→A[3]
42: trk 1;ldf 63,V,V+4
43: "CLF":p1→J[1];D[7]→J[2];p2→J[3];p3→J[4];D[12]→J[7];p4→J[12]
44: "CF1":cll 'EN'(J[1],0,0,J[10],0,0,0,J[11]);J[11]+E[4]→J[11]
45: 'MA'(J[12],J[10])→J[13];'ATT'(J[13],J[11])→J[14]
46: cll 'EN'(J[1],J[13],J[14],J[10],J[15],J[16],J[6],J[17])
47: cll 'GS'(J[7],J[11],J[13],J[18],J[19])
48: cll 'EL'(3,J[14],J[1],Y,J[20],J[21])
49: 'TH'(J[21],J[20],J[13],J[1],J[10])→J[26]
50: 'FF'(J[1],J[26],J[13],J[10],J[15],J[14])→J[22]
51: cll 'DR'(J[2],J[10],J[13],J[23],J[24])
52: 'AC'(J[12],J[1],J[10])→J[25]
53: 'AT'(3,J[1],J[12],J[2],J[26],J[24],J[23],0)→J[27]
54: 'CR'(J[25],J[13],J[15],J[26],J[24],J[2])→J[28]
55: (J[22]/(60*J[28]))J[3]→J[29];(J[18]/(60*J[28]))J[3]→J[30]
56: (1/J[28])J[3]→J[9];J[29]→p5;J[30]→p6;J[9]→p7;J[12]→p8;ret
*16240

20: "11NOV12":
21: "V16":F[16+R]+F[29]→F[42]
22: F[42]+29→M[33]
23: if R=8 and F[29]=2;M[33]+F[31]→M[33]
24: ret
25: "V17":0→r41;if R=2 and F[29]=2;1→r41
26: F[8+R]+r41→r41
27: if R#8;jmp 4
28: r41+F[29]-1→r41
29: if F[29]=1;jmp 2
30: r41+F[31]→r41
31: 61+r41→M[34];ret
32: "V18":0→M[23]→M[24];ret
33: "V26":for Q=0 to p1;0→D[61+Q];next Q;ret
34: "ZI3":0→F[32];0→E[17]
35: gsb "V16"
36: if W=29;D$[M[33]]→D$[29]
37: "ZI4":cll 'V12'(9,F);cll 'V14'(11,X)
38: gsb "V17"
39: cll 'V26'(5)
40: "EIO":R→M[48];A[25]→M[49];eir 2
41: eir 2,0;if bit(12,F)=1;128→r37;jmp 2
42: 0→r37
43: gsb "YDU"
44: if W>14 and bit(8,F)=0;gsb "XCU"
45: if F[31]=1 and D[71]<.2 and R>3 and Z=0;0→M[27];-5→D[55]
46: gsb "V18"
47: if M[27]=1;gto "ZI5"
48: if R=1;gto "Z5"
49: if M[27]=1;M[33]→W;gto "ZI3"
50: 57→W;cll 'V26'(7);cll 'YDU';1→M[30];gsb "XCU"
51: eir 2;if R=1;gto "ZI3"
52: jmp -1
53: "V9":gsb "V7"
54: wait 50
55: tfr 2,"B";eir 2,0;wait 50
```

```
56: for N=1 to 27;rdb("B")→U[N];next N;buf "B";sto "VV"
57: "ZI5":if bit(8,F)=1;jmp 7
58: if W>14;jmp 4
59: W→M[21];gsb "XCU"
60: eir 2
61: eir 2,0;if T#0;sto "Z5"
62: M[33]→W;if bit(13,F)=1;29→W
63: gsb "XCU"
64: "Z5":if F[41]=1;sto "EY"
65: cll 'V9'(65480);for Q=25 to 27;band(U[Q],cmpM[16])→U[Q];next Q
66: "U[27].128→U[27];U[27]-D[75]→M[25];ifM[25]<0;4194.5+M[25]→M[25]":
67: "band(U[25],14)→r43;if r43=0";30→M[25];jmp 6
68: "Z6":if M[41]<4;M[41]+1→M[41];jmp -4
69: if M[42]<6;M[42]+1→M[42];sto "Z9"
70: 58→W;gsb "XCU"
71: cll 'V26'(5);gsb "YDU"
72: sto "Z8"
73: for Q=11 to 16;band(U[Q],cmpM[20])→U[Q];next Q
74: for Q=17 to 24;band(U[Q],8191)→U[Q]
75: 6825.83-U[Q]→U[Q];next Q
76: for Q=0 to 2;if U[14+Q]<F[26+Q] or U[14+Q]>F[26+Q]+400;sto "Z6"
77: next Q
78: for Q=0 to 1;if U[23+Q]<M[43] or U[23+Q]>M[43]+200;sto "Z6"
79: next Q
80: trk 0;ldf 12,V,V+1
81: "Z8":0→M[42]
82: "Z9":0→M[41]
83: sto "EY"
*3490

20: "12V":p2+p1→p4;U[16+p1]F[p1+90]→p3;ret
21: 25→N;26→Q;if bit(6,U[N])=0 or bit(7,U[N])=0;cll 'V14'(2,Y);jmp 2
22: cll 'V12'(2,Y)
23: if R=2 or bit(8,U[N])=1;jmp 2
24: if R=2 or bit(10,U[N])=0 or bit(9,U[N])=0;cll 'V14'(1,Y);jmp 2
25: cll 'V12'(1,Y)
26: if bit(1,U[Q])=0 or bit(3,U[Q])=0;cll 'V14'(3,Y);jmp 2
27: cll 'V12'(3,Y)
28: if bit(2,U[Q])=0;cll 'V14'(4,Y);jmp 2
29: cll 'V12'(4,Y)
30: if bit(4,U[Q])=0 and bit(5,U[Q])=0;cll 'V14'(5,Y);jmp 2
31: cll 'V12'(5,Y)
32: if bit(4,U[Q])=0 xor bit(5,U[Q])=0;cll 'V14'(6,Y);jmp 2
33: cll 'V12'(6,Y)
34: if R=2;15→Z;jmp 2
35: 0→Z;if R=8;30→Z
36: if bit(6,U[Q])=1;0→Z
37: if bit(7,U[Q])=1;2→Z
38: if bit(8,U[Q])=1;5→Z
39: if bit(9,U[Q])=1;15→Z
40: if bit(10,U[Q])=1;30→Z
41: if bit(11,U[Q])=1;1→F[31];jmp 2
42: 0→F[31]
43: for Q=1 to 5;cll '12V'(Q,68,U[Q]);next Q
44: int(U[5]/5)→r42;frc(U[5]/5)→r41;if U[4]<1;jmp 4
45: if U[4]<4;jmp 4
46: if r41>.5;jmp 3
47: r42-1→r42;jmp 2
48: if r41>.5;r42+1→r42
49: 5r42+U[4]→U[4];for N=1 to 4;if U[N]>F[86+N];U[N]-F[82+N]→U[N]
50: U[N]+F[78+N]→U[N];next N
```

```
51: for Q=11 to 14;U[Q]-U[15]→U[Q];next Q;0→r41      5676
52: for Q=11 to 13;U[Q]F[57+Q]/(U[16]-U[15])+r41→r41;next Q
53: 2978→41;U[14]→U[5];for Q=1 to 5;68+Q→N          3071
54: cll 'V15'(U[Q],N,U[Q],U[Q+5]);if U[Q+5]=1;jmp 3
55: "if abs(U[Q]-D[N])>F[Q+95]M[25];1→U[Q+5]";U[Q]→D[N];jmp 2
56: "(U[Q]M[25]/300+D[N])itf(S$[N])/(M[25]/300+itf(S$[N]))→D[N]":
57: next Q
58: if U[9]=0 and bit(1,M[50])=0;D[72]→D[11]
59: if U[7]=0 and D[70]<50;0→D[2]
60: if U[10]=1 or bit(0,M[50])=1;jmp 2
61: D[73]→D[10];U[27]→D[75];D[18]-M[25]D[2]/3600→D[18]
62: if U[6]=1;jmp 3
63: (D[69]+273.16)(.2D[1]↑2+1)-273.16→D[9];if U[8]=1;jmp 2
64: cll 'EN'(D[11],0,0,r46);'IS'(D[71],r46)→D[8]
65: 0→M[42]→M[41];if R=8 and F[29]=2;51+F[31]→M[33]→W;gsb "XCU"
66: trk 1;rcf 60,D[*],F[*],M[*]
67: gto "EY"
*17558
```

```
20: "RCD13":if D[75]<0;0→J[1];jmp 2
21: D[75]→J[1]
22: R→J[2]
23: for A=3 to 10;D[58+A]→J[A];next A
24: for A=1 to 11;D[A]→J[A+10];next A
25: if R<=3;D[12]→J[22];jmp 3
26: if R=6;D[14]→J[22];jmp 2
27: if R=8;D[55]→J[22];jmp 2
28: D[13]→J[22]
29: F[29]→J[23]
30: X→J[24];Y→J[25];Z→J[27]
31: F[30]→J[26]
32: for A=28 to 32;D[A+41]→J[A];next A
33: M[25]→J[33]
34: M[26]→J[34]
35: M[29]→J[35]
36: F[31]→J[36]
37: F[41]→J[37]
38: M[35]+1→M[35];if M[35]=60;71→M[35]
39: trk 1;rcf M[35],J[*];trk 0
40: trk 0;ldf 11,V,V+20
*24569
```

```
20: "TDCL14":0→D[28]→D[29]→J[39];D[7]→J[2];if D[11]-D[33]>0;jmp 13
21: D[66]→J[36];D[11]→J[38]
22: if D[11]<10;10-D[11]+.00001→J[39];10→J[37];jmp 6
23: J[38]+J[39]→J[38];.96D[66]→J[36];5→J[39];J[38]+J[39]→J[37]
24: if D[33]-J[38]<J[39];D[33]-J[38]→J[39];J[38]+J[39]→J[37]
25: if D[11]<10;.96*340→J[36]
26: if J[38]<25;jmp 2
27: cll 'EN'(J[38]+J[39]/2,0,0,J[10]);.78→J[13];'IS'(J[13],J[10])→J[36]
28: cll 'CLF'(J[38],J[39],J[37],J[36],J[29],J[30],J[34],J[33])
29: D[28]+J[34]→D[28];J[2]-J[29]→J[2]
30: D[29]+J[30]→D[29];if D[28]<0 or D[29]<0;0→D[28]→D[29]
31: if J[37]>=D[33];jmp 2
32: jmp -9
33: trk 1;ldf 63,V,V+39
```

```
34: "CLF":p1→J[1];p2→J[3];p3→J[4];D[20]→J[7];p4→J[33]
35: 0→J[29]→J[30]→J[34];if J[1]>25;J[1]-J[39]/2→J[1]
36: cll 'EN'(J[1],0,0,J[10],0,0,0,J[11])
37: J[11]+E[4]→J[11];'D2'(93,J[2]/10J[10])→J[35];'IS'(J[35],J[10])→J[35]
38: if J[33]<J[35]→J[33];jmp 2
39: 'ASX'(J[1],Z)→J[35];if J[33]>J[35];J[35]→J[33]
40: 'MA'(J[33],J[10])→J[13]
41: if J[13]<=.895;jmp 2
42: .895→J[13];'IS'(J[13],J[10])→J[33]
43: 'ATT'(J[13],J[11])→J[14]
44: cll 'EN'(J[1],J[13],J[14],J[10],J[15],J[16],J[6],J[17])
45: cll 'GS'(J[7],J[11],J[13],J[18],J[19])
46: cll 'EL'(3,J[14],J[1],Y,J[20],J[21])
47: 'TH'(J[21],J[20],J[13],J[1],J[10])→J[26]
48: 'FF'(J[1],J[26],J[13],J[10],J[15],J[14])→J[22]
49: cll 'DR'(J[2],J[10],J[13],J[23],J[24])
50: J[33]→J[40];if J[1]>25;J[13]→J[40]
51: 'AC'(J[40],J[1],J[10])→J[25]
52: 'AT'(3,J[1],J[40],J[2],J[26],J[24],J[23],0)→J[27]
53: 'CR'(J[25],J[13],J[15],J[26],J[24],J[2])→J[28]
54: J[29]+(J[22]/(60*J[28]))J[3]→J[29]
55: J[30]+(J[18]/(60*J[28]))J[3]→J[30]
56: J[34]+J[3]/J[28]→J[34];J[29]→p5;J[30]→p6;J[34]→p7;J[33]→p8;ret
*4224

20: "TDCZ15":
21: D[18]→D[29]
22: "cll 'CZF'(D[7],D[11],D[19],D[66],J[20],J[13])":
23: 60D[29]/D[2]→D[28]
24: if R=4;trk 1;ldf 64,V,V+27
25: if R=5;trk 1;ldf 65,V,V+31
26: trk 1;ldf 67,V,V+30
27: "CZF":p1→J[1];p2→J[3];p3→J[5];p4→J[21]
28: cll 'EN'(J[3],0,0,J[10],0,0,0,J[8]);J[8]+E[4]→J[8]
29: 'MA'(J[21],J[10])→J[2]
30: 'ATT'(J[2],J[8])→J[9]
31: cll 'EN'(J[3],J[2],J[9],J[10],J[11],J[8],J[4],J[12])
32: cll 'GS'(J[5],J[8],J[2],J[13],J[14])
33: cll 'DR'(J[1],J[10],J[2],J[15],J[16])
34: cll 'ER'(J[2],J[3],J[16],J[10],J[17],J[18])
35: 'TH'(J[18],J[17],J[2],J[3],J[10])→J[35]
36: 'FF'(J[3],J[35],J[2],J[10],J[11],J[9])→J[19]
37: 'CZ'(J[13],J[19])→J[20]
38: J[20]→p5;J[13]→p6;ret
*28610

20: "TDSC16":D[11]-5→J[1];D[7]→J[6];5→J[38];0→J[29]→J[39]
21: "F4":cll 'EN'(J[1],0,0,J[3],0,0,0,J[23]);J[23]+E[4]→J[23]
22: if J[1]<10;250→J[2];'MA'(J[2],J[3])→J[4];jmp 3
23: 'MA'(A[22],J[3])→J[4]
24: A[22]→J[2]
25: if J[4]<A[23];jmp 2
26: A[23]→J[4];'IS'(J[4],J[3])→J[2]
27: 'D2'(93,J[6]/10J[3])→J[7];'IS'(J[7],J[3])→J[7]
28: if J[2]<J[7];J[7]→J[2];jmp 3
29: 'ASX'(J[1],Z)→J[7]
```

```
30: if J[2]>J[7];J[7]→J[2]
31: 'MA'(J[2],J[3])→J[4]
32: if J[4]<=.895;jmp 2
33: .895→J[4];'IS'(J[4],J[3])→J[2]
34: 'ATT'(J[4],J[23])→J[30]
35: cll 'EN'(J[1],J[4],J[30],J[3],J[20],J[21],J[22],J[23])
36: cll 'DR'(J[6],J[3],J[4],J[10],J[11])
37: 'AC'(J[2],J[1],J[3])→J[12]
38: cll 'GS'(D[14],J[21],J[4],J[35],J[36])
39: if J[1]<32;'IT'(J[4],J[1])→J[31];jmp 3
40: 'DL'(J[1])→J[32]
41: 'DT'(J[11],J[32],J[6],J[12],J[36])→J[31]
42: 'DS'(J[12],J[36],J[31],J[11],J[6],J[35])→J[40]
43: if J[1]-J[38]<0;J[1]→J[38]
44: J[39]+J[38]/J[40]→J[39];J[29]+(J[35]/60)(J[38]/J[40])→J[29]
45: J[1]-J[38]→J[1]
46: J[1]-D[43]→J[28]
47: if J[28]<10 and J[28]>0;2→J[38]
48: if J[28]<=0;jmp 2
49: sto "F4"
50: J[39]→D[28]
51: J[29]→D[29]
52: if D[11]>=5 and D[43]<=5;D[28]+5.5→D[28];D[29]+5.5(250/60)→D[29];jmp 2
53: D[28]+3→D[28];D[29]+3(250/60)→D[29]
54: if D[28]<0 or D[29]<0;0→D[28]→D[29]
55: trk 1;ldf 66;V,V+29
56: "DL":'D2'(98,p1)→p2
57: ret p2
*24654

20: "MDIT17":trk 1;ldf 70,J[*];trk 0
21: dsp "MODE",R,"TIME",J[10],"ALT",D[11]
22: D[10]→J[11];1→J[21]→A[2];0→Z→J[3];D[18]-J[20]/60*A[2]→D[18]
23: (1-.00688D[11])↑5.2561537→J[13];2→Y;1→J[32]
24: if J[31]=1;trk 0;ldf 22,V,V
25: if R=1;jmp 14
26: if R#4 and R#5 and R#7;jmp 5
27: .8→D[71]→J[25]→J[35];0→J[32]
28: 2→J[7]→J[8]
29: 'IS'(D[71],J[13])→D[8]→J[24]
30: jmp 9
31: if R=2;150→D[8]→J[24]→J[35];2→J[7]→J[8]
32: if R#3;jmp 3
33: if D[11]<=24;340→D[8]→J[24]→J[35];2→J[7]→J[8]
34: if D[11]>24;.8→D[71]→J[25]→J[35];2→J[7]→J[8];0→J[32]
35: if R=6;340→D[8]→J[24]→J[35];.9→J[7]→J[8]
36: if R=8;150→D[8]→J[24]→J[35];1.5→J[7]→J[8];30→Z
37: if D[11]<10 and D[8]>250;250→D[8]→J[24]→J[35];1→J[32]
38: 'MA'(D[8],J[13])→D[71]→J[25]
39: trk 0;ldf 18,V,V
*16675

20: "MDII18":
21: J[10]+J[21]→J[10]→D[75];0→J[15]→J[16]
22: if D[11]>D[21];.2243/2.718↑((D[11]-D[21])/20.806)→J[13];jmp 2
23: (1-.00688D[11])↑5.2561537→J[13]
```

```
24: if R=1;jmp 6
25: 'TH'(J[7],J[8],D[71],D[11],J[13])→J[6]
26: cll 'DR'(D[7],J[13],D[71],J[27],J[14])
27: J[6]-J[14]→J[28]
28: if R#4 and R#5 and R#7;jmp 2
29: if J[28]>=-2 and J[28]<=2;4→J[29];0→J[28];J[14]→J[6]
30: if R=1;gto "MPF"
31: if R=8;gto "MDT"
32: if J[28]>0;gto "MCT"
33: if J[28]=0;gto "TM"
34: if J[28]<0;gto "MDT"
35: "MPF":
36: A[9]→J[18];D[10]-J[21]J[18]/60→D[10];D[10]+A[25]-J[21]J[18]/60→J[17]
37: if D[22]<D[21];jmp 2
38: -56.5→J[30];jmp 2
39: 15-1.9812D[22]→J[30]
40: D[23]-J[30]→J[19];.556D[24]-17.778→J[9]
41: 0→J[6]→D[11];gto "MG"
42: "MCT":
43: if D[11]<D[21];jmp 2
44: -56.5+J[19]→J[30];jmp 2
45: 15-1.9812D[11]+J[19]→J[30]
46: 'ATT'(D[71],J[30])→D[9];(D[9]+273.16)/(.2D[71]↑2+1)/288→J[3]
47: 'AC'(J[35],D[11],J[13])→J[26]
48: if R=2;1→J[15];jmp 2
49: 'CR'(J[26],D[71],J[3],J[6],J[14],J[17])→J[15]
50: D[11]+J[21]J[15]→D[11]
51: gto "TM"
52: "MDT":
53: if D[11]<D[21];jmp 2
54: -56.5→J[30];jmp 2
55: 15-1.9812D[11]→J[30]
56: 'ATT'(D[71],J[30]+J[19])→D[9]
57: if R=8;1→J[16];jmp 9
58: cll 'EN'(D[11],D[71],D[9],J[13],J[3],J[9],J[19],J[30])
59: 'AC'(J[35],D[11],J[13])→J[26]
60: cll 'EN'(D[11],D[71],D[9],J[13],J[3],J[9],J[19],J[30])
61: cll 'GS'(D[14],J[9],D[71],J[20],J[23])
62: 'DS'(J[26],J[23],J[6],J[14],J[17],J[20])→J[16]
63: D[11]-J[21]J[16]-D[17]/1000→r23
64: if r23>.5;jmp 2
65: D[11]/2J[21]→J[16]
66: D[11]-J[21]J[16]→D[11]
67: "TM":trk 0;ldf 19,V,V
68: "MG":trk 1;rcf 70,J[*];trk 0
69: if J[31]=1;trk 0;ldf 24,V,V
70: gto "EX1"
*13717

20: "MDIII19":
21: if D[11]>D[21];.2243/2.718↑((D[11]-D[21])/20.806)→J[13];jmp 2
22: (1-.00688D[11])↑5.256153→J[13]
23: if J[32]=0;'IS'(D[71],J[13])→D[8];jmp 2
24: 'MA'(D[8],J[13])→D[71]
25: if D[11]>=D[17];jmp 2
26: if J[31]=1;trk 0;ldf 23,V,V+16
27: "MTAT":if D[11]<D[21];jmp 2
28: -56.5→J[30];jmp 2
29: 15-1.9812D[11]→J[30]
30: 'ATT'(D[71],J[30]+J[19])→D[9]
31: cll 'EN'(D[11],D[71],D[9],J[13],J[3],J[9],J[19],J[30])
32: if J[7]<1 or J[8]<1;jmp 3
```

```
33: 'TH'(J[7],J[8],D[71],D[11],J[13])→J[6]
34: 'FF'(D[11],J[6],D[71],J[13],J[3],D[9])→J[18];jmp 6
35: 'IT'(D[71],D[11])→J[6]
36: if D[71]>.6;jmp 2
37: 'D3'(122,10,D[11],D[71])→J[18];jmp 2
38: 'D3'(126,13,D[11],D[71])→J[18]
39: if J[18]<.54;.54→J[18]
40: D[10]-J[21]J[18]/60→D[10];J[17]-J[21]J[18]/60→J[17]
41: cll 'DR'(D[7],J[13],D[71],J[27],J[14])
42: if J[28]=0;J[14]→J[6]
43: 'AT'(R,D[11],J[35],J[17],J[6],J[14],J[27],Z)→J[12];if R=2;15→J[12]
44: if J[31]=1;trk 0;ldf 23,V,V+30
45: if R<=3;D[12]→J[33];jmp 3
46: if R=4;D[13]→J[33];jmp 2
47: D[14]→J[33]
48: cll 'GS'(J[33],J[9],D[71],J[20],J[23])
49: J[21]J[20]/60+J[5]→J[5]
50: "MMSG":trk 1;rcf 70,J[*];trk 0
51: if J[31]=1;trk 0;ldf 24,V,V
52: gto "EX1"
*6659

20: "MD120":trk 1;ldf 70,J[*];if J[4]=1;jmp 4
21: ent "PRINT Y=1,N=0",J[31]
22: if J[31]=1;trk 0;ldf 23,V,V
23: D[10]→J[11];1→J[21]
24: if J[31]=1;trk 0;ldf 22,V,V
25: D[18]-D[2]A[2]/60→D[18]
26: if J[31]=0;prt "ALT",D[11];prt "MODE",R;wait 5000
27: "MD1":if J[4]=0;1→J[4];gto "MMSG"
28: if J[1]=1;jmp 9
29: if R=1 and J[2]<=1;jmp 9
30: if R#J[2];1→J[22];J[2]→R;jmp 2
31: jmp 3
32: if R<=1;jmp 6
33: jmp 8
34: if R=8;jmp 3
35: if R<=1 or J[22]=0;jmp 3
36: if J[22]=1;0→J[22]
37: trk 0;ldf 21,V,V
38: trk 0;ldf 18,V,V
39: "MMSG":trk 1;rcf 70,J[*]
40: if J[31]=1;trk 0;ldf 24,V,V
41: "M9":trk 1;rcf 70,J[*];gto "EX1"
42: "F0":1→J[1];gto "MD1"
43: "F1":1→J[2];"PRE-FLIGHT"→M$;gto "K1"
44: "F2":2→J[2];"TAKE-OFF"→M$;gto "K1"
45: "F3":3→J[2];"CLIMB"→M$;gto "K1"
46: "F4":4→J[2];"CRUISE"→M$;gto "K1"
47: "F5":5→J[2];"TURB PEN"→M$;gto "K1"
48: "F6":6→J[2];"DESCENT"→M$;gto "K1"
49: "F7":7→J[2];"HOLD"→M$;gto "K1"
50: "F8":8→J[2];"APPROACH"→M$;gto "K1"
51: "K1":0→J[3];1→F[29];0→E[17]
52: if J[31]=0;jmp 2
53: fmt 3,3/;wrt 2,3;wrt 2,"    ",M$;wrt 2,3;wrt 2,T$,T$,T$,T$,T$,T$
54: gto "MD1"
*30624
```

What is claimed is:

1. A performance advisory system for use in optimizing aircraft performance comprising:
   (a) a display unit for displaying to the pilot recommended flight parameters;
   (b) a control unit including means for selecting a mode of aircraft operation for which recommended flight parameters are required;
   (c) means for converting and multiplexing inputs from aircraft sources indicating actual operating parameters, which inputs comprise a plurality of inputs in analog form, another plurality in analog synchro form and further plurality in digital form comprising:
      (i) an analog multiplexer having a plurality of data inputs and a single data output and an address input, said analog parameters being coupled to the data inputs of said analog multiplexer;
      (ii) an analog to digital converter having its input coupled to the data output of said analog multiplexer;
      (iii) a random access memory having a data input, a data output and an address input the data input of said random access memory coupled to the output of said digital to analog converter and the data output of said memory coupled to said computing means; and
      (iv) a cyclic address generator for cyclically addressing each of the inputs to said analog multiplexer having an output coupled to both said analog multiplexer address input and said random access memory address input, whereby the data present at the data inputs to said analog multiplexer will be successively loaded into locations of said random access memory; and
   (d) computing means including at least a central processing unit and a fixed program memory having as inputs the outputs from said control unit indicating the mode of operation and said digital information, for solving the flight equations for the aircraft on which said system is installed, said computing means providing recommended flight parameters as outputs which are coupled to said display unit.

2. The apparatus according to claim 1 and further including gating means coupling said cyclic address generator output to the input of said random access memory; an address decoder coupled to said computing means and receiving therefrom desired address locations, the output of said address decoder also coupled through said gating means to said random access memory; and means to disable said cyclic address generator upon detecting an output from said address decoder whereby, upon being addressed by said computing means, a location in said random access memory storing in digital form, one of said analog input parameters may be addressed and provide said input information to said computing means.

3. Apparatus according to claim 1 wherein said means for multiplexing said digital data comprise a data bus interface element having a plurality of inputs and a single word output, said interface element also having an address input and an address decoder receiving an input from said computing means and providing an address output to said data bus interface element, the output of said data bus interface element being coupled to said computing means whereby said computing means may address said data bus interface element to selectively obtain therefrom any of the individual digital data inputs thereto.

4. A performance advisory system for use in optimizing aircraft performance comprising:
   (a) a display unit for displaying to the pilot recommended flight parameters;
   (b) a control unit including means for selecting a mode of aircraft operation for which recommended flight parameters are required;
   (c) means for converting and multiplexing inputs from aircraft sources indicating actual operating parameters, which inputs comprise a plurality of inputs in analog form, another plurality in analog synchro form and a further plurality in digital form comprising:
      (i) an analog multiplexer having a plurality of data inputs and a single data output and an address input, said analog parameters being coupled to the data inputs of said analog multiplexer;
      (ii) a synchro to digital converter having its input coupled to the data output of said analog multiplexer;
      (iii) a random access memory having a data input, a data output and an address input, the data input of said random access memory coupled to the output of said analog to digital converter and the data output of said memory coupled to said computing means; and
      (iv) a cyclic address generator for cyclically addressing each of the inputs to said analog multiplexer having an output coupled to both said analog multiplexer address input and said random access memory address input, whereby the data present at the data inputs to said analog multiplexer will be successively loaded into locations of said random access memory; and
   (d) computing means including at least a central processing unit and a fixed program memory having as inputs the outputs from said control unit indicating the mode of operation and said digital information for solving the flight equations for the aircraft on which said system is installed, said computing means providing recommended flight parameters as outputs which are coupled to said display unit.

5. The apparatus according to claim 4 and further including gating means coupling said cyclic address generator output to the input of said random access memory; an address decoder coupled to said computing means and receiving therefrom desired address locations, the output of said address decoder also coupled through said gating means to said random access memory; and means to disable said cyclic address generator upon detecting an output from said address decoder whereby, upon being addressed by said computing means at a location in said random access memory storing in digital form one of said analog input parameters may be addressed and provide said input information to said input computing means.

6. A performance advisory system for use in optimizing aircraft performance comprising:
   (a) a display unit for displaying to the pilot recommended flight parameters comprising:
      (i) a random access memory for storing each of a plurality of data words related to information to be displayed;
      (ii) a segmented digital display matrix;
      (iii) first and second display decoder drivers providing X and Y inputs to said matrix; and
      (iv) a cyclic address generator providing its output to said random access memory and one of said display decoder drivers the other of said display decoder drivers receiving its inputs from said random access memory;

(v) gating means coupling said cyclic address generator to said random access memory; and (vi) an address latch having an input coupled to said computing means and providing its output through said gating means to said random access memory, said address latch responsive to disable said cyclic address generator upon receipt of an address from said computing means;

(b) a control unit including means for selecting a mode of aircraft operation for which recommended flight parameters are required out of the modes of preflight, take-off, climb, cruise, turbulent air penetration, descent, holding and approach;

(c) means for converting inputs from aircraft sources indicating actual operating parameters which inputs comprise analog information, analog synchro-information and digital information all into digital information; and (d) computing means including at least a central processing unit and a fixed program memory having as inputs the outputs from said control unit indicating the mode of operation and said digital information, for solving the flight equations for the aircraft on which said system is installed, said computing means providing recommended flight parameters as outputs which are coupled to said display unit.

7. Apparatus according to claim 6 wherein said control unit comprises:

(a) a display portion comprising:
  1. a random access memory for storing each of a plurality of data words related to information to be displayed;
  2. a segmented digital display matrix;
  3. first and second display decoder drivers provide X and Y inputs to said matrix; and
  4. a cyclic address generator providing its output to said random access memory and one of said display decoder drivers the other of said display decoder drivers receiving its inputs from said random access memory; and (b) an input portion comprising:
  1. a plurality of keyboard push buttons;
  2. an encoder having as an input the outputs from said push buttons and providing as its output encoded data representative of said push buttons;
  3. a data bus interface element having the output of said encoder as an input and providing its output to said computing means; and
  4. an address latch receiving an address input from said computing means and providing an output to said data bus interface element to selectively couple information from said input means into said computing means.

8. Apparatus according to claim 7 wherein said computing means are coupled to said display unit and said control unit through an interface module, said interface module comprising a word to byte multiplexer the output of which is coupled to said random access memories in said display unit and control unit and to said data bus interface element and a word to byte address control having its output coupled respectively to the address latches in said display unit, said control unit display portion and said control unit input portion.

9. Apparatus according to claim 8 wherein said computing means have a combined sixteen bit data address and control bus.

10. Apparatus according to claim 9 wherein said interface module coupling said computing means to said display unit and control unit converts said sixteen bit to an eight bit address bus and an eight bit data bus.

11. Apparatus according to claim 8 and further including means for switching said display unit between a first, upper scale and a second, lower scale thereby doubling the number of parameters which can be displayed by said display unit.

12. Apparatus according to claim 11 wherein said display unit includes first, second, third and fourth parameter displays and a mode display indicative of the mode selected on said control unit.

13. Apparatus according to claim 12 wherein said display unit on said upper display displays POD engine pressure ratio required, CTR center engine pressure ratio required, PAT, command pitch altitude, and IAS command indicated airspeed, and on said lower scale displays POD LIM engine pressure ratio limit, CTR LIM center engine pressure ratio limit, OPT ALT optimum altitude, MAX ALT maximum altitude.

14. Apparatus according to claim 12 wherein said control unit includes a display section for displaying four digits of alpha numeric data and four digits of numeric data and an input section including a plurality of numeric keyboard push buttons; a mode selector switch.

15. Apparatus according to claim 14 wherein said mode selector switch permits selecting between the modes of pre-flight, takeoff, climb, cruise, turbulent air penetration, descent, holding, and approach.

16. Apparatus according to claim 15 wherein each of said numeric push buttons also is capable of operating in a mode in which requested data is displayed and further including an additional push button for indicating a data request.

17. Apparatus according to claim 15 wherein said computing means perform time for distance calculations and further including pushbutton means on said control unit for initiating a time for distance mode of operation.

18. Apparatus according to claim 15 wherein at least some of said modes have sub-modes and further including means on said control unit for selecting one of the sub-modes.

19. Apparatus according to claim 15 and further including means on said control unit for initiating a simulated engine out condition whereby, prior to shutting down an engine, recommended flight parameters for operating in an engine out condition may be determined.

20. Apparatus according to claim 15 and further including means on said control unit for entering a derate mode of operation whereby parameters may be computed for derated operation.

21. Apparatus according to claim 15 wherein said computing means operate in a planning mode using simulated input data and further including means associated with said control unit for entering a planning mode and means on said numeric key board switches for inserting and clearing information whereby information relating to simulated operating conditions is inserted by means of said numeric keyboard and said system caused to provide recommended flight parameter outputs for said simulated condition.

22. Apparatus according to claim 21 and further including an indicator on said control unit indicating that the data being supplied thereon relates to a planning mode of operation.

* * * * *